(12) United States Patent
Park et al.

(10) Patent No.: US 9,538,117 B2
(45) Date of Patent: Jan. 3, 2017

(54) SUPPORT FRAME AND DISPLAY DEVICE INCLUDING THE SAME

(71) Applicant: SAMSUNG ELECTRONICS CO., LTD., Suwon-si (KR)

(72) Inventors: Jae Hoo Park, Suwon-si (KR); Eui Seok Kim, Seongnam-si (KR); Hyun Jun Jung, Yongin-si (KR); Su-An Choi, Seoul (KR); Kwang Sung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 458 days.

(21) Appl. No.: 13/770,331

(22) Filed: Feb. 19, 2013

(65) Prior Publication Data

US 2014/0192270 A1 Jul. 10, 2014

(30) Foreign Application Priority Data

Jan. 7, 2013 (KR) .................. 10-2013-0001817
Feb. 19, 2013 (KR) .................. 10-2013-0017723

(51) Int. Cl.
*H04N 5/645* (2006.01)
*F16M 11/10* (2006.01)
*F16M 11/24* (2006.01)

(52) U.S. Cl.
CPC .............. *H04N 5/645* (2013.01); *F16M 11/10* (2013.01); *F16M 11/24* (2013.01); *F16M 2200/028* (2013.01)

(58) Field of Classification Search
CPC ........ H04N 5/645; F16M 11/24; F16M 11/10; F16M 2200/028

USPC .................................................. 348/836–843
See application file for complete search history.

(56) References Cited

U.S. PATENT DOCUMENTS

| 4,843,477 | A | * | 6/1989 | Mizutani et al. | ............. 348/837 |
| 6,119,384 | A | * | 9/2000 | Fischer | ...................... 40/606.02 |
| 7,627,969 | B2 | | 12/2009 | Ericson | |
| 2002/0096979 | A1 | * | 7/2002 | Johnson | ........................ 312/205 |
| 2003/0223188 | A1 | | 12/2003 | Ha et al. | |

(Continued)

FOREIGN PATENT DOCUMENTS

| CN | 201042051 Y | 3/2008 |
| CN | 102109081 A | 6/2011 |

(Continued)

OTHER PUBLICATIONS

Communication dated Apr. 1, 2015, issued by the French Patent Office in counterpart French Application No. 1363711.

(Continued)

*Primary Examiner* — Tung Vo
*Assistant Examiner* — Zaihan Jiang
(74) *Attorney, Agent, or Firm* — Sughrue Mion, PLLC

(57) ABSTRACT

A television apparatus comprises a support frame and a leg member extending from the support frame to support the support frame in an inclined orientation. The television apparatus further comprises a display panel unit having a chassis movably mounted to the support frame via a first coupling assembly mounted between a right side edge portion of the chassis and a right side section of the support frame, and a second coupling assembly mounted between a left side edge portion of the chassis and a left side section of the support frame.

27 Claims, 52 Drawing Sheets

(56) References Cited

U.S. PATENT DOCUMENTS

| | | | |
|---|---|---|---|
| 2005/0110911 | A1 | 5/2005 | Childrey et al. |
| 2005/0239037 | A1* | 10/2005 | Lertsithichai et al. ....... 434/365 |
| 2005/0264689 | A1 | 12/2005 | Yang et al. |
| 2006/0137232 | A1* | 6/2006 | Mann .............................. 40/610 |
| 2007/0127215 | A1 | 6/2007 | Jeong |
| 2007/0146569 | A1 | 6/2007 | Nouchi et al. |
| 2008/0230671 | A1 | 9/2008 | Xing |
| 2009/0015604 | A1* | 1/2009 | Ozaki et al. .................. 345/694 |
| 2010/0053912 | A1 | 3/2010 | Harita |
| 2010/0079942 | A1 | 4/2010 | Yamamoto et al. |
| 2011/0026114 | A1* | 2/2011 | Abe et al. ..................... 359/461 |
| 2011/0260960 | A1 | 10/2011 | Jean et al. |
| 2012/0020056 | A1 | 1/2012 | Yamagata et al. |
| 2012/0033375 | A1 | 2/2012 | Madonna et al. |
| 2012/0081874 | A1 | 4/2012 | Wu et al. |
| 2012/0262907 | A1 | 10/2012 | Lee et al. |
| 2012/0281367 | A1 | 11/2012 | He et al. |
| 2013/0155655 | A1 | 6/2013 | Lee et al. |
| 2013/0329162 | A1 | 12/2013 | Fujii et al. |

FOREIGN PATENT DOCUMENTS

| | | | |
|---|---|---|---|
| CN | 102436780 | A | 5/2012 |
| DE | 20 2013 100 638 | U1 | 3/2013 |
| GB | 2481854 | A | 1/2012 |
| JP | 2008-309813 | A | 12/2008 |
| KR | 10-1994-0001224 | A | 1/1994 |
| KR | 10-0435826 | B1 | 8/2004 |
| RU | 2008104789 | A | 8/2009 |
| RU | 2008120460 | A | 11/2009 |
| RU | 2 426 938 | C1 | 8/2011 |
| RU | 2011 119 641 | A | 11/2012 |
| RU | 2011 134 845 | A | 2/2013 |
| WO | 2011/071455 | A1 | 6/2011 |

OTHER PUBLICATIONS

Communication dated Apr. 22, 2015 issued by the Russian Patent Office in counterpart Russian Patent Application No. 2013157508.
Communication dated Mar. 6, 2015 issued by the Australian Patent Office in counterpart Australian Patent Application No. 2013204014.
Communication dated Mar. 26, 2015 issued by the Canadian Intellectual Property Office in counterpart Canadian Patent Application No. 2,837,945.
Communication dated Apr. 5, 2016, issued by the Australian Patent Office in counterpart Australian Patent Application No. 2013204014.
Communication dated May 12, 2016, issued by the European Patent Office in counterpart European Patent Application No. 14150280.7.
Communication dated Apr. 22, 2016, issued by the Federal Service for Intellectual Property in counterpart Russian Patent Application No. 2013157508.
Request for correction dated May 30, 2016, issued to the Federal Service for Intellectual Property in counterpart Russian Patent Application No. 2013157508.
Communication dated Jun. 3, 2016, issued by the Federal Service for Intellectual Property in counterpart Russian Patent Application No. 2013157508.
Non-Final Office Action dated Feb. 12, 2016, issued by United States Patent and Trademark Office in U.S. Appl. No. 14/289,868.
Notice of Allowance dated Jul. 19, 2016, issued by United States Patent and Trademark Office, in U.S. Appl. No. 14/289,868.
Communication dated Jun. 27, 2016, issued by the Korean Patent Office in counterpart Korean Application No. 10-2015-0011165.
Communication dated Jun. 20, 2016, issued by the European Patent Office in counterpart European Application No. 14170230.8.
Communication dated Jan. 23, 2015 issued by Australian Intellectual Property Office in counterpart Australian Patent Application No. 2014202903.
Communication dated Jan. 12, 2015 issued by Russian Intellectual Property Office in counterpart Russian Application No. 2014121729/07.
XP 55132010 A / TomTom ONE XL; Nov. 19, 2008; 58 pages total.
Communication dated Aug. 5, 2014, issued by the European Patent Office in counterpart European Application No. 14170230.8.
Communication dated Sep. 30, 2015 issued by the Russian Patent Office in counterpart Russian Patent Application No. 2014121729/07.

* cited by examiner

SUPPORT FRAME AND DISPLAY DEVICE INCLUDING THE SAME

CROSS-REFERENCE TO RELATED APPLICATION(S)

This application claims the benefit of Korean Patent Application No. 2013-0001817, filed on Jan. 7, 2013, and Korean Patent Application No. 2013-0017723, filed Feb. 19, 2013, in the Korean Intellectual Property Office, the disclosures of which are incorporated herein by reference.

BACKGROUND

1. Field

Embodiments of the present invention relate to a support frame to support a display unit on which an image is displayed and a display device including the support frame.

2. Description of the Related Art

Display devices, such televisions, generally include electronic display panel units to display moving images.

To achieve an optimal viewing condition, a display unit preferably needs to be disposed at a certain desired height so that a user can comfortably and clearly view images appearing thereon.

To position a display unit at a certain desired height, in general, the display unit may need to be placed on a top of a desk or shelf via a stand connected to the display unit or the display unit may need to be installed on a fixed bracket fixed to a wall and used as a wall-mounted type.

SUMMARY

Accordingly, it is an aspect of the present invention to provide a display device which enables a height of a display panel unit to be selectively adjusted.

In accordance with one aspect of the present invention, a display device includes a display unit to display an image and a support frame having a rectangular shape (e.g., an upright tetragonal ring shape) and provided at an inner side thereof with the display unit.

The support frame may further include a leg extending backward the rectangular frame member to stably support the rectangular frame member in an inclined orientation.

The leg may further include a leg extending to be inclined backward and downward from the support frame and supported by the ground.

The leg may include a pair of extension portions extending from opposite sides of the support frame backward and downward and a support portion connecting rear ends of the extension portions and supported by the ground.

The leg may be separably installed at the support frame.

The support frame may include a lower frame supported by a ground, an upper frame disposed above the lower frame in parallel thereto to be spaced apart from the lower frame, and a pair of side frames connecting opposite ends of the upper frame to opposite ends of the lower frame, a distance between the upper frame and the lower frame may be larger than a longitudinal width of the display unit, and the display unit may be installed in the support frame movably upward and downward.

The display device may further include a pair of connection shafts having first ends respectively installed at opposite sides of the display unit and second ends respectively installed at opposite sides of the support frame and a pair of support units installed in the support frame to respectively support the second ends of the connection shafts movably upward and downward.

Each of the support units may include a hollow cylinder and a gas spring including a rod movably installed at the hollow cylinder.

The display device may further include locking members respectively installed at the connection shafts movably in a shaft direction, and the support frame may include guide slots extending upward and downward to enable the connection shafts to be movable upward and downward and locking grooves arranged at the guide slots to have a shape corresponding to that of the locking members to enable the locking members to be inserted thereinto.

The display device may further include locking springs installed at the respective connection shafts to elastically support the respective locking members toward the locking grooves.

The display device may further include at least one wire having an upper end connected to an upper portion of the support frame and a lower end connected to a lower portion of the support frame, and the display unit may be installed at the wire movably upward and downward.

The display unit may be installed at the support frame to be tilted forward and backward.

The display device may further include a connection shaft having a first end installed at the support frame and a second end rotatably installed at the display unit and a hinge unit installed at the display unit and rotating together with the display unit through rotatable installation of the connection shaft at the hinge unit.

The hinge unit may include a fixed bracket fixed to the display unit and a hinge bracket installed at the fixed bracket and provided with the connection shaft rotatably installed thereat.

The hinge unit may include a friction bracket installed at the fixed bracket in parallel to the hinge bracket and including a friction portion to restrict rotation of the display unit, a friction member fixed to the connection shaft and rubbing against the friction portion while rotating with the connection shaft, and a friction spring installed at the connection shaft and pressing the friction member toward the friction portion.

The friction member may be in the form of a sector having a central angle of less than 180°.

The hinge unit may include a support spring having an upper end fixed to an upper portion of the friction bracket, disposed above the connection shaft and a lower end elastically supporting a lower portion of the connection shaft.

The display unit may be installed at the support frame rotatably in right and left directions.

The support frame may include a lower frame supported by a ground, an upper frame disposed above the lower frame in parallel thereto to be spaced apart from the lower frame, and a pair of side frames connecting opposite ends of the upper frame to opposite ends of the lower frame, a distance between the pair of side frames may be larger than a transverse width of the display unit, and the display unit may be installed in the support frame movably in right and left directions.

The support frame may further include a plurality of sub-speakers.

The support frame may further include a camera.

The camera may be rotatably installed so as to protrude from the support frame while rotating.

The display unit may include a pair of main speakers disposed at opposite sides of a lower portion of a rear surface of the display unit.

The display device may further include an input/output unit configured to input/output signals.

The display device may further include a leg extending from the support frame backward and downward and supported by the ground, wherein the leg may include a pair of extension portions extending from opposite sides of the support frame backward and downward and a support portion connecting rear ends of the extension portions and supported by the ground, wherein the input/output unit may be detachably installed at the support portion.

The input/output unit may be installed at a rear surface of the display unit.

The input/output unit may be installed at the support frame.

The display device may further include at least one circuit board installed at a rear surface of the display unit.

The at least one circuit board may include a power board to supply power, a signal processing board to process an image signal, a panel driving board to control an operation of a display panel built in the display unit, and a backlight driving board to control an operation of a backlight unit built in the display unit.

The display device may further include a pair of connection shafts having first ends respectively installed at the support frame and second ends rotatably installed at the display unit, a hinge unit installed at the display unit and rotating together with the display unit through rotatable installation of the connection shaft at the hinge unit, a pair of support units installed in the support frame to respectively support the second ends of the connection shafts movably upward and downward, and a connection cable extending through the hinge unit and configured to connect the circuit board to electronic components disposed at an inside of the support frame.

The support frame may include a bobbin around which the connection cable is wound, a bobbin guide rail on which the bobbin is installed movably up and down, and an elastic member elastically supporting the bobbin downward.

The display device may further include a cable extending from the display unit, wherein one of the extension portions may include a cable accommodating groove to accommodate a part of the cable and a cable cover to cover the cable accommodating groove.

The display device may further include an input/output unit, wherein the cable may include a power cable connected to an external power source and an input/output cable connected to the input/output unit.

In accordance with another aspect of the present invention, a support frame has an upright tetragonal ring shape and is provided at an inner side thereof with a display unit displaying an image.

As described above, the display device includes the support frame having an upright tetragonal ring shape and thus the display unit may be installed at a certain height using the support frame.

In addition, the display unit is installed at the support frame movably upward and downward, and thus, the height of the display unit may be easily adjusted.

Moreover, the display unit is rotatably installed at the support frame and thus may be tilted forward and backward or rotated in right and left directions.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
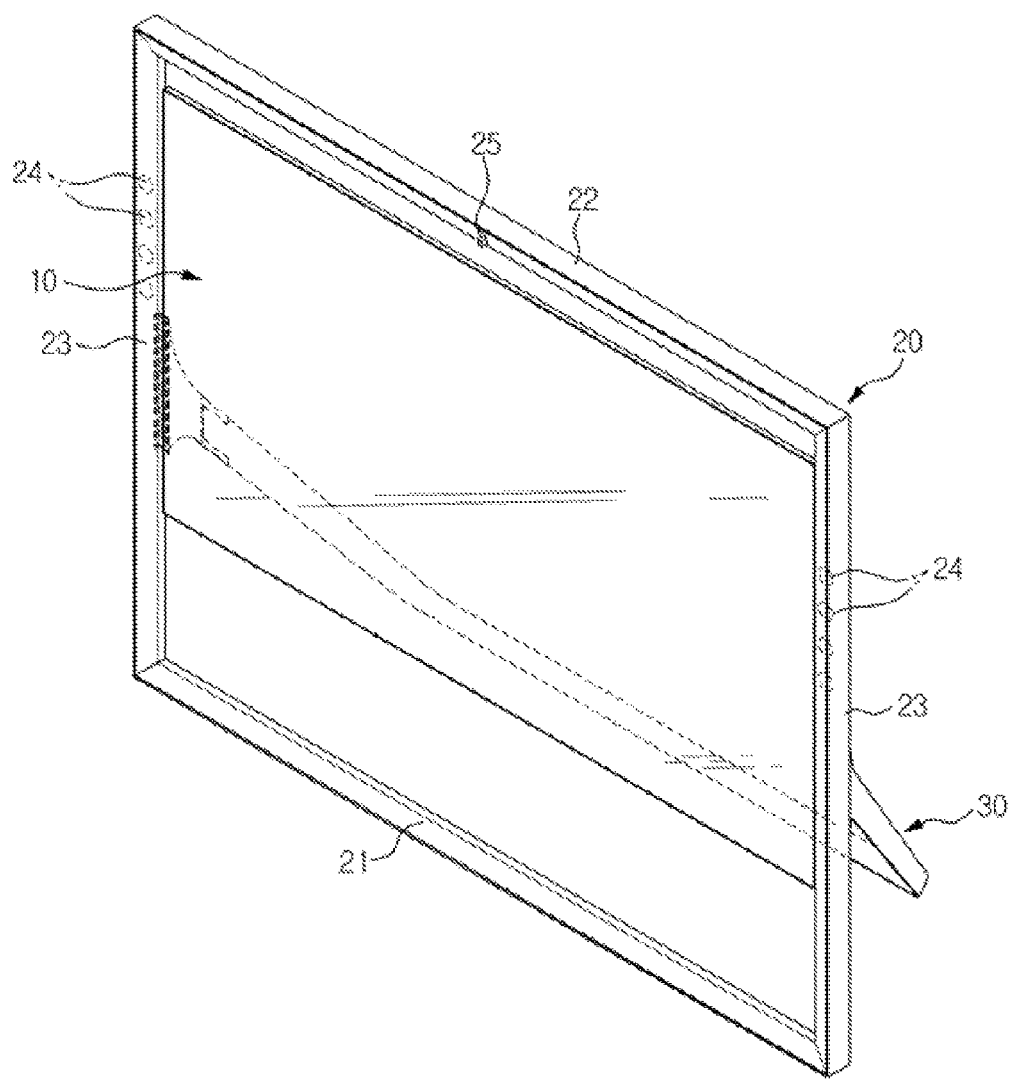
FIG. 1 is a perspective view of a display device according to an embodiment.

Reference will now be made in detail to the embodiments of the present invention, examples of which are illustrated in the accompanying drawings, wherein like reference numerals refer to like elements throughout.

Hereinafter, a display device according to an embodiment will be described in detail with reference to the accompanying drawings.

Figure 2:
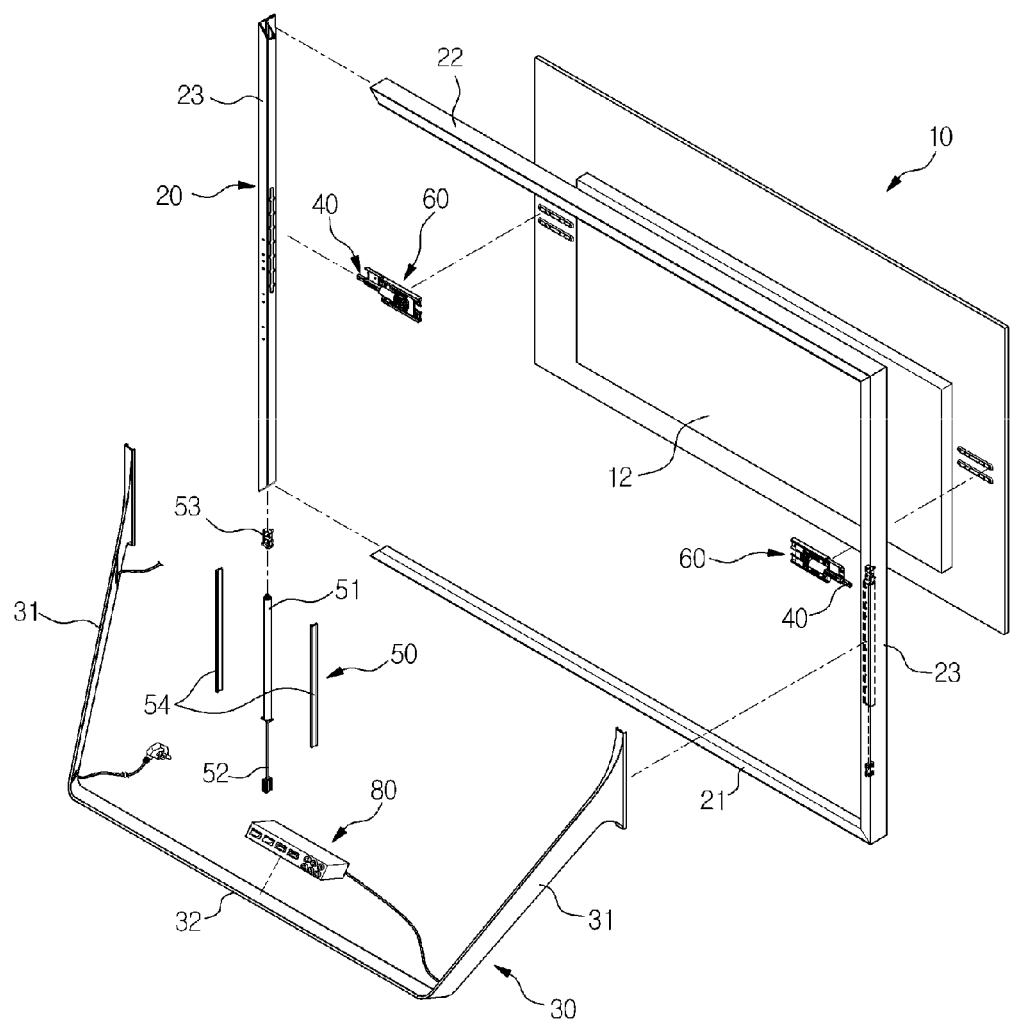
FIG. 2 is an exploded perspective view of the display device according to the embodiment illustrated in FIG. 1.
Figure 3:
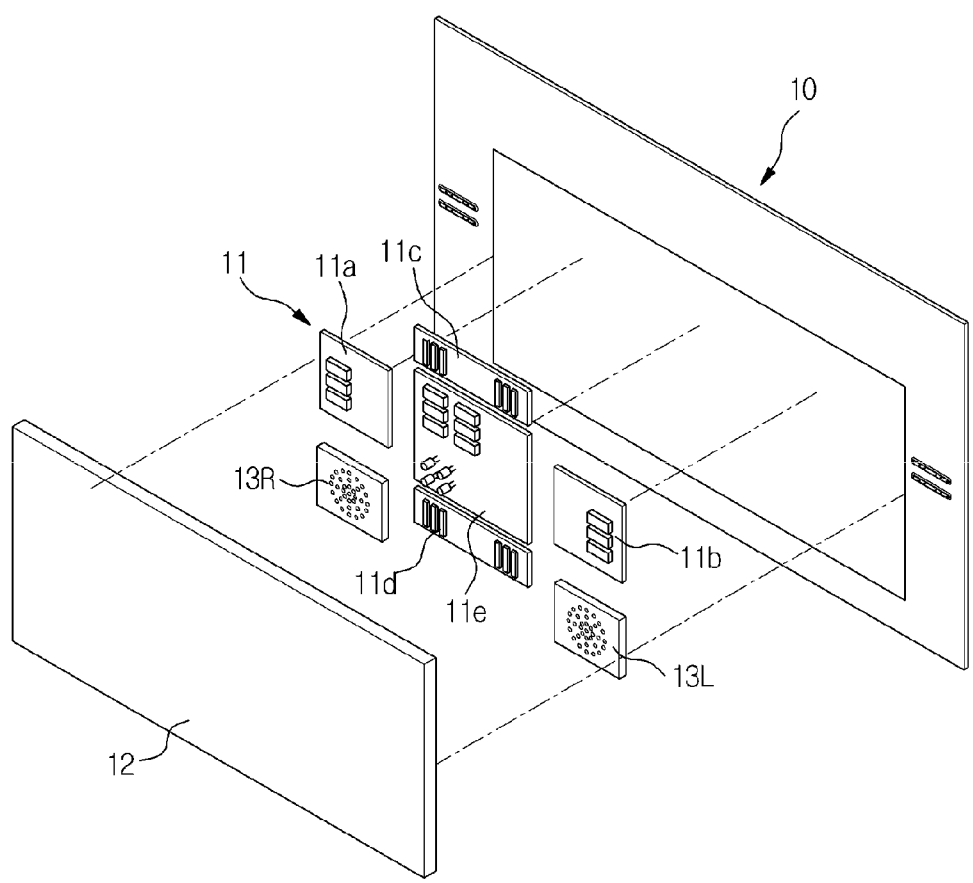
FIG. 3 is an exploded perspective view of the display device according to the embodiment illustrated in FIG. 1.

As illustrated in FIGS. 1 to 3, the display device, e.g., television apparatus, includes an electronic display panel unit 10 having a chassis to display images and a support frame 20 having a rectangular shape (e.g, an upright tetragonal ring shape) to movably support the display unit 10. In the present embodiment, the support frame 20 is inclined backward and upward.

The display unit 10 according to an embodiment includes various types of circuit boards 11 installed at a rear surface of the display unit 10 to control the display device, a rear surface cover 12 installed at the rear surface of the display unit 10 to cover the circuit boards 11, and a pair of main speakers 13R and 13L respectively disposed at opposite sides of a lower portion of the display unit 10 to output sound.

The circuit boards 11 include a power board 11a to supply the display device with power, a signal processing board 11b to process image signals, panel driving boards 11b and 11c (also referred to herein as "timing control boards" or "T-Con boards") to control the driving of a display panel (not shown) included in the display unit 10, and a backlight driving board 11e to control the driving of a backlight unit (not shown) included in the display unit 10.

In an embodiment, the display unit 10 includes the total of four display panels to form a large-sized screen, and the panel driving boards 11c and 11d include two panel driving boards 11c and 11d to control the driving of the four display panels. One panel driving board 11c (first timing control board) of the two panel driving boards 11c and 11d is disposed at an upper side of the backlight driving board 11e to control the driving of two display panels located at an upper side among the four display panels, and the remaining panel driving board 11d (second timing control board) of the two panel driving boards 11c and 11d is disposed at a lower side of the backlight driving board 11e to control the driving of two display panels located at a lower side among the four display panels.

In another embodiment, the display unit 10 includes a single display panel to form the entire screen, and two timing control boards 11c and 11d to control the driving of the single display panel. First timing control board 11c is disposed at an upper side of the display unit to control the driving of an upper region the display panel, and second timing control board 11e is disposed at a lower side of the display unit to control the driving of a lower region the display panel. In addition, the display device includes an input/output unit 80 that allows external signals to be input to the display unit 10 or allows various signals being generated from the display unit 10 to be output to the outside. The input/output unit 80 includes various input/output terminals, and is installed at a leg 30 that is to be described later.

The support frame 20 includes a lower frame 21 that extends in a width direction of the display unit 10, an upper frame 22 that extends in the width direction of the display unit 10 and is disposed above the lower frame 21 in parallel thereto to be spaced apart from the lower frame 21, and a pair of side frames 23 (also referred to herein as "first side section" and "second side section" respectively) that connect opposite ends of the lower frame 21 to opposite ends of the upper frame 22 to define opposite sides of the support frame 20.

In addition, the display device includes a leg 30 to support the support frame 20 in an inclined orientation. The leg 30 extends to be inclined backward and downward from the side frames 23 of the support frame 20 and is supported by the ground so that the support frame 20 is maintained stably in the inclined orientation. The leg 30 includes a pair of extension portions 31 respectively extending to be inclined backward and downward from the side frames 23, and a support portion 32 connecting rear ends of the extension portions 31 and supported by the ground.

Figure 5:
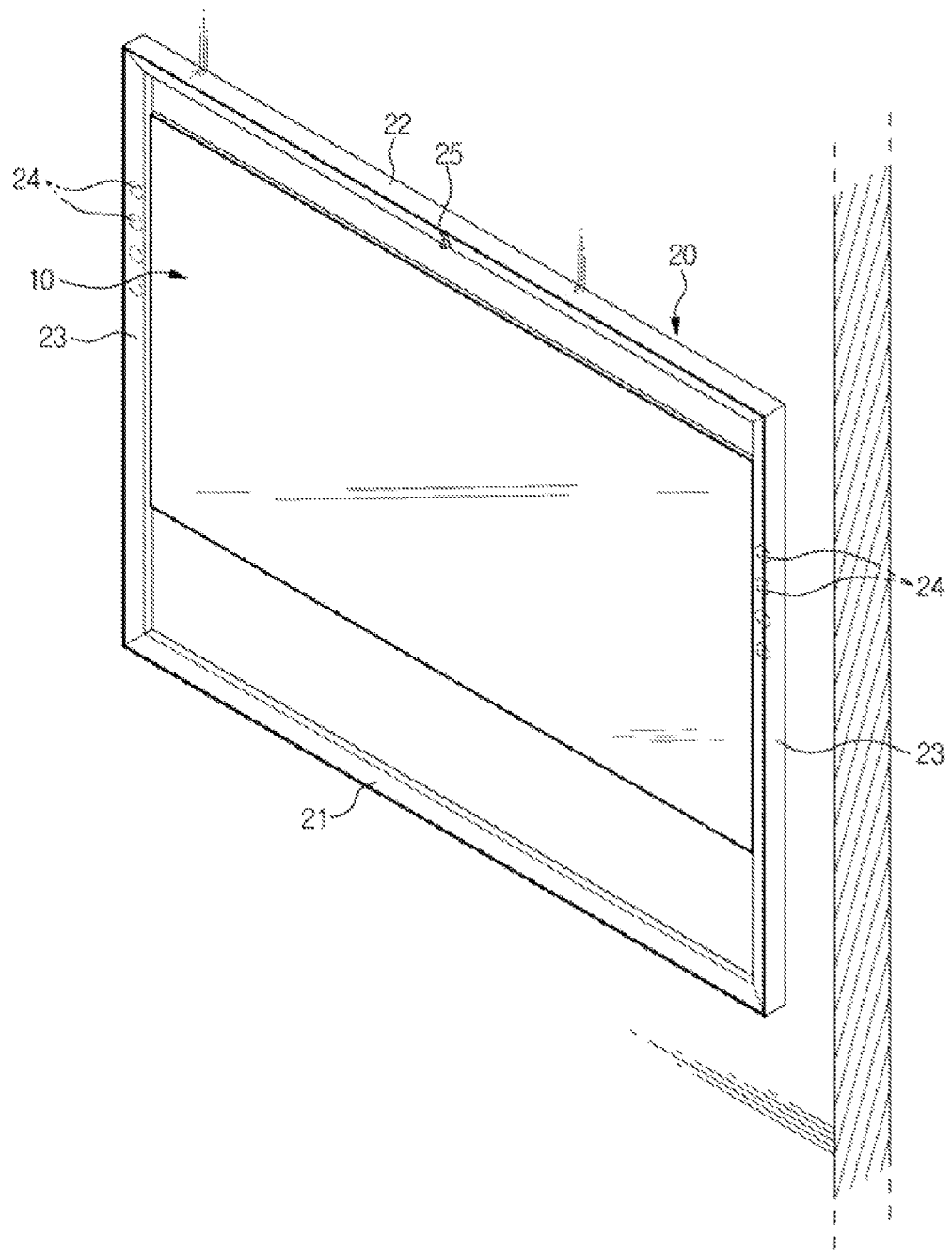
FIG. 5 is a perspective view illustrating a state in which the display device according to the embodiment illustrated in FIG. 1 is installed on a wall.

In the present embodiment, the leg is separably installed at the side frames 23 of the support frame 20. Thus, in a state in which the leg 30 is separated from the support frame 20, the support frame 20 and the display unit 10 may be installed on a wall as illustrated in FIG. 5, and in a state in which the leg 30 is installed at the support frame 20, the support frame 20 may be independently standing as illustrated in FIG. 1.

Figure 6:
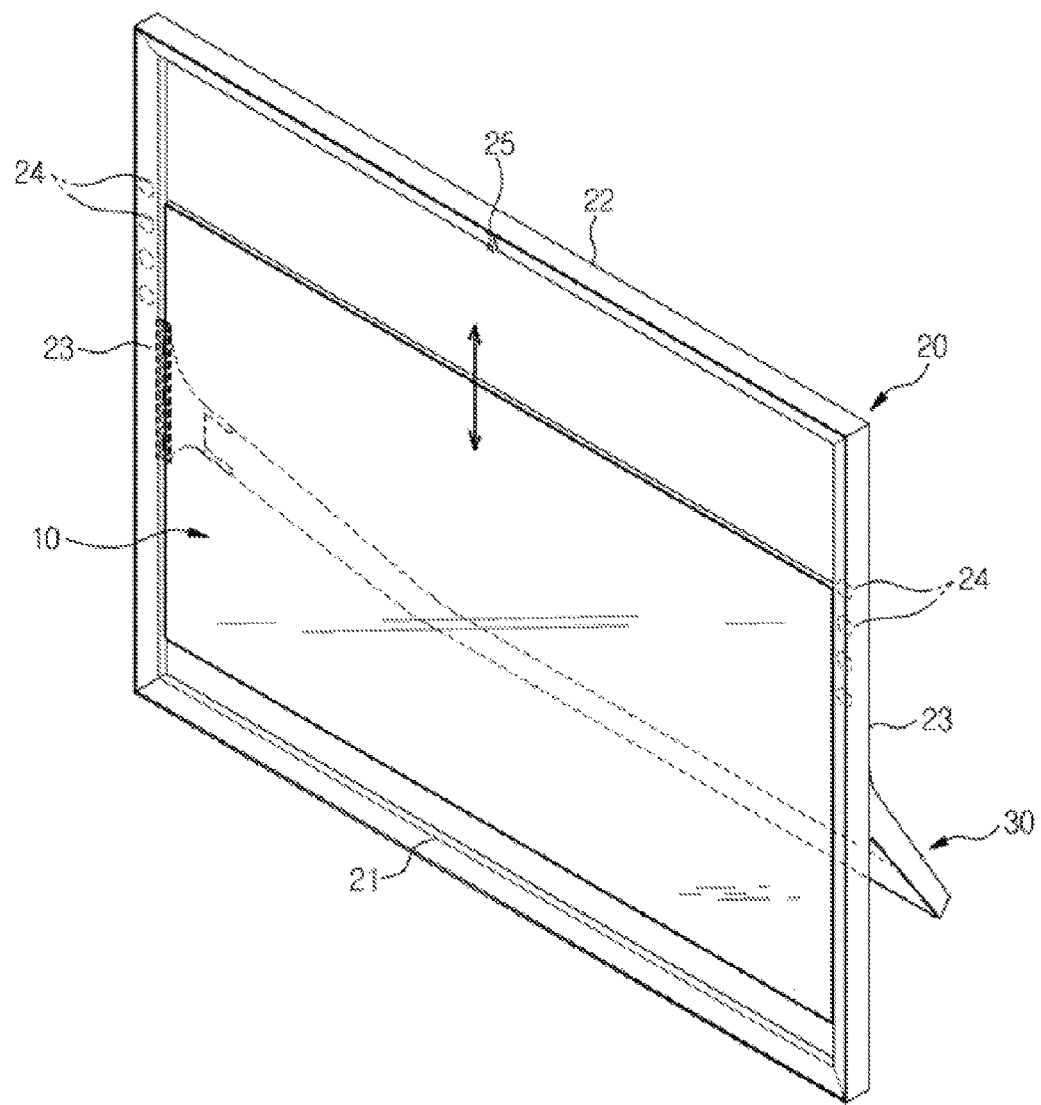
FIG. 6 is a perspective view illustrating upward and downward movements of a display unit of the display device according to the embodiment illustrated in FIG. 1.
Figure 7:
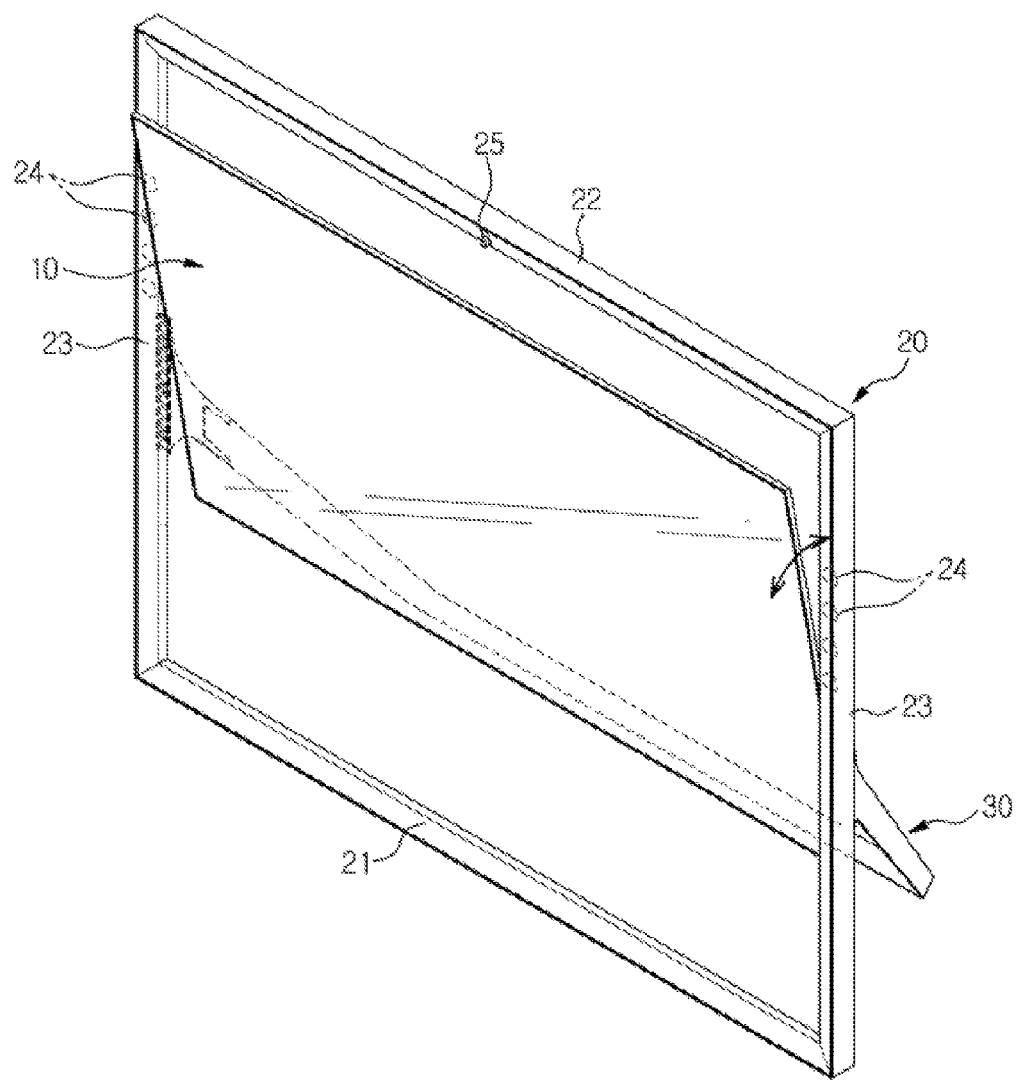
FIG. 7 is a perspective view illustrating forward and backward rotation of the display unit of the display device according to the embodiment illustrated in FIG. 1.

In addition, a distance between the upper frame 22 and the lower frame 21 is formed larger than a longitudinal width of the display unit 10, and the display unit 10 may be installed movably upward and downward at the inner side of the support frame 20 such that an installation height of the display unit 10 can be adjusted up and down as illustrated by comparison between FIG. 1 and FIG. 6. In addition, as illustrated by comparison between FIG. 1 and FIG. 7, the display unit 10 may be selectively rotated forward and backward at the inner side of the support frame 20 to be a desired tilted orientation.

To guide the upward and downward movements and rotation of the display unit 10, the display unit 10 and the support frame 20 are connected to each other via a pair of connection shafts 40 as illustrated in FIGS. 8 through 11. Each connection shaft 40 has a first end installed at the display unit 10 and a second end installed movably upward and downward at the support frame 20, and the connection shafts 40 enable opposite sides of the display unit 10 to be respectively installed at opposite sides of the support frame 20. The support frame 20 is provided at inner surfaces of the opposite sides of the support frame 20, i.e., at inner side surfaces of the side frames 23 of the support frame 20, with guide slots 23a that extend upward and downward to enable the connection shafts 40 to selectively move upward or downward along the right and left side sections 23 of the support frame. Thus, as the connection shafts 40 move upward or downward along the guide slots 23a arranged at the opposite sides of the support frame 20, the display unit 10 also moves upward or downward together with the connection shafts 40.

Each side frame 23 of the support frame 20 is provided, inside thereof, with a support unit 50 that elastically supports the connection shaft 40. In the present embodiment, the support unit 50 includes a hollow cylinder 51 and a gas spring including a rod 52 movably installed at the hollow cylinder 51. In addition, the cylinder 51 is provided, at an upper side thereof, with a fixed block 53, which is fixed to an upper portion of the cylinder 51 and to which the second end of the connection shaft 40 is fixed.

The cylinder 51 is movable upward or downward inside the support frame 20, and the rod 52 protrudes downward from the cylinder 51 and a lower end of the rod 52 is fixed to the support frame 20. In order that the cylinder 51 is movably installed in the support frame 20, the cylinder 51 is provided at opposite sides thereof with rails 54, and rail grooves (not shown) having a shape corresponding to that of the rails 54 are formed in a longitudinal direction at an inside hollow region of the support frame 20.

The support unit 50 is configured so as to support a load corresponding to a weight of the display unit 10. Thus, when no external force is applied upward or downward to the display unit 10, the display unit 10 supported by the support unit 50 is maintained at a height at which the display unit 10 is previously disposed, and the cylinder 51 moves upward or downward only when an external force is applied to the display unit 10 to manually move the display unit in an up or down direction.

In addition, locking members 41 are installed at the respective connection shafts 40 movably in a shaft direction, and the support frame 20 is provided with locking grooves 23b having a shape corresponding to that of the locking members 41 so that the locking members 41 are selectively inserted into the locking grooves 23b according to a position of the locking members 41. In addition, each connection shaft 40 is provided with an elastic member 42 that elastically supports the locking member 41 toward the locking groove 23b to maintain a state in which the locking member 41 is inserted into the locking groove 23b. In the present embodiment, the locking grooves 23b are installed at each guide slot 23a to be spaced apart from each other upward and downward. Thus, the upward or downward movement of the connection shafts 40 is restricted by corresponding the locking member 41 to one of the locking grooves 23b after the display unit 10 is moved upward or downward to a desired height and the locking member 41 is inserted into the corresponding locking groove 23b by moving the locking member 41 in the shaft direction. By doing so, a certain desired height at which the display unit 10 is disposed may be maintained.

In addition, as described above, in order that the display unit 10 is rotatably installed at the support frame 20, the display unit 10 is provided at opposite sides thereof with hinge units 60 at which the connection shafts 40 are rotatably installed.

Figure 8:
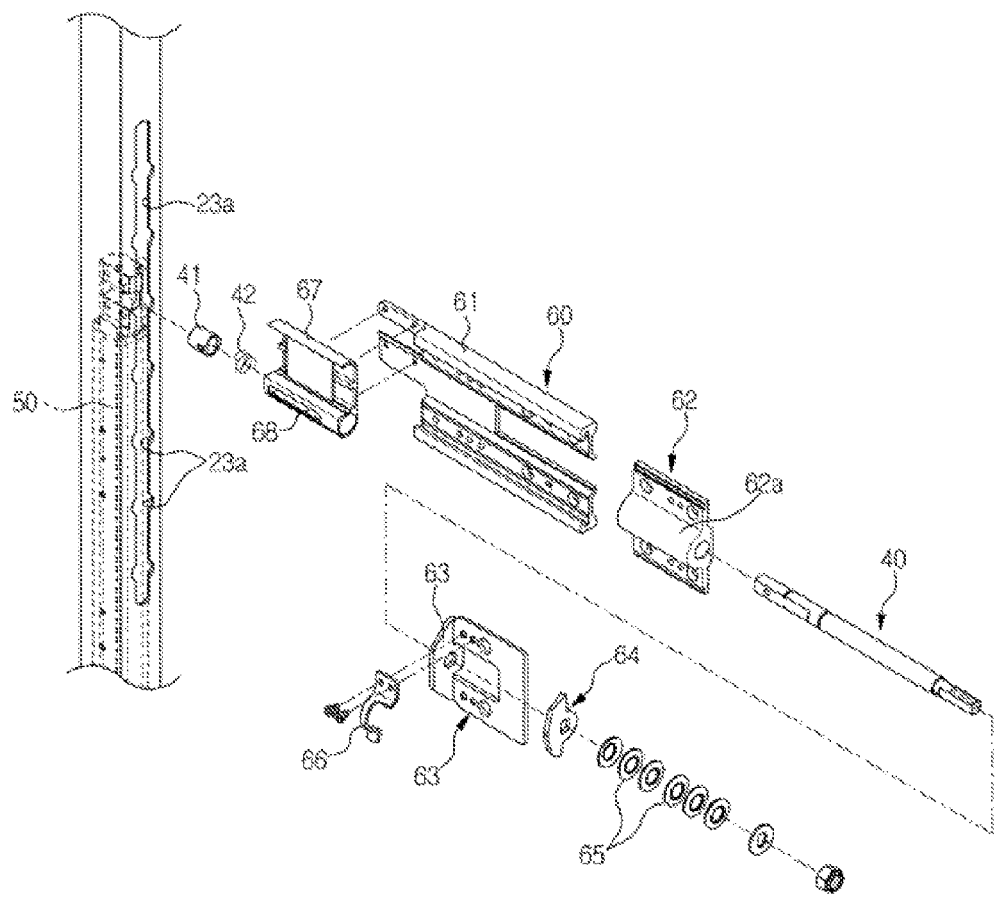
FIG. 8 is an exploded perspective view illustrating an installation state of a connection shaft and a hinge unit of the display device according to the embodiment illustrated in FIG. 1.
Figure 9:
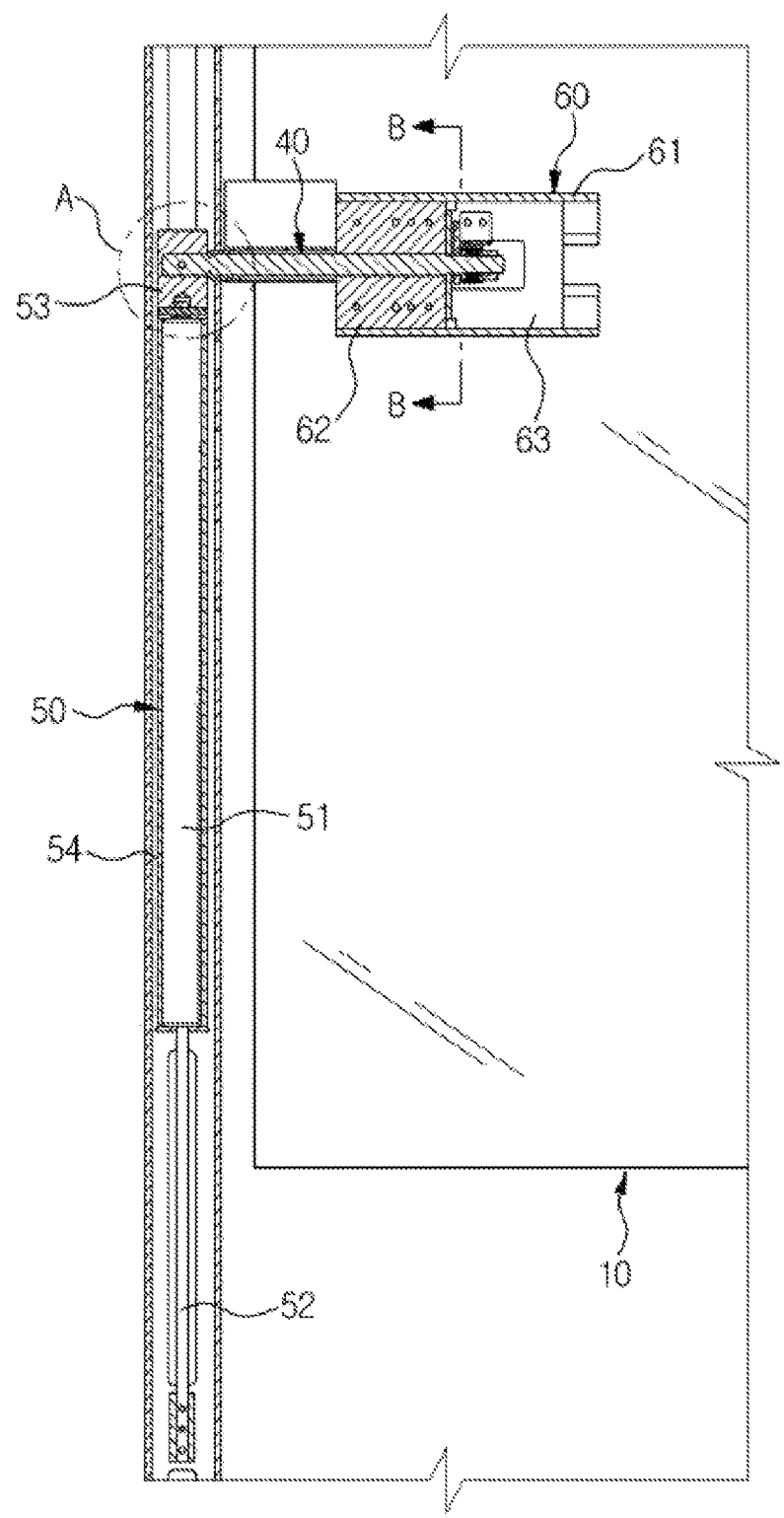
FIG. 9 is a cross-sectional view illustrating an installation state of the connection shaft and the hinge unit of the display device according to the embodiment illustrated in FIG. 1.
Figure 10:
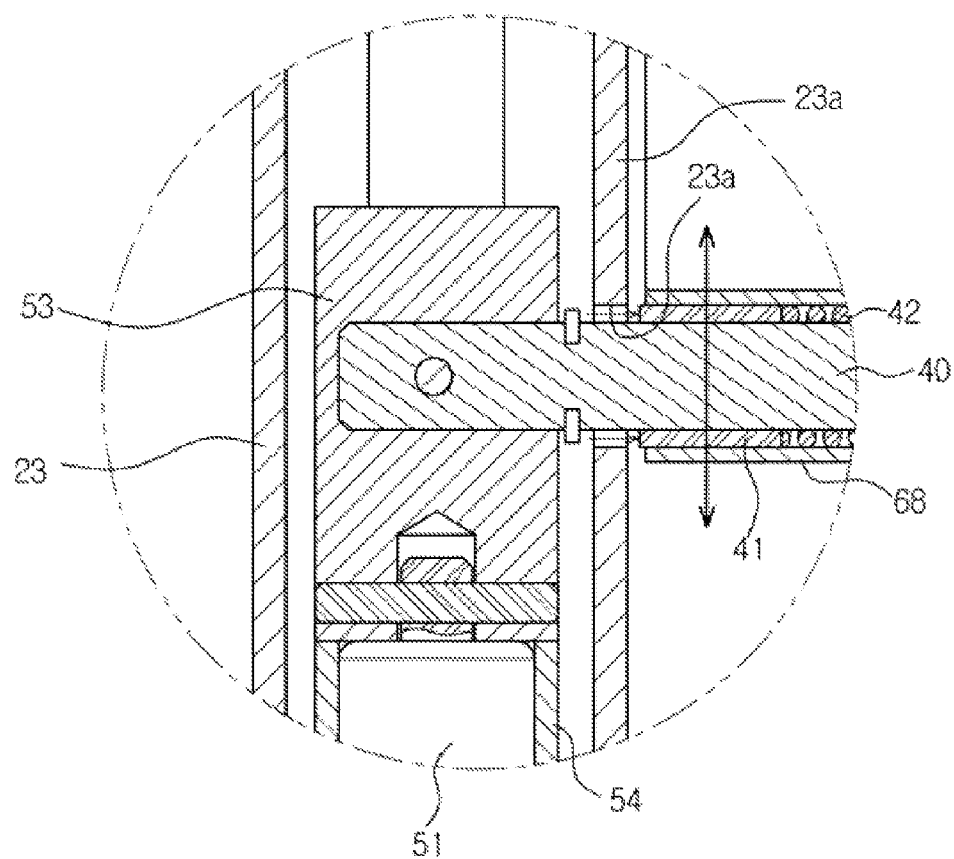
FIG. 10 is an enlarged view of portion A of FIG. 9.
Figure 11:
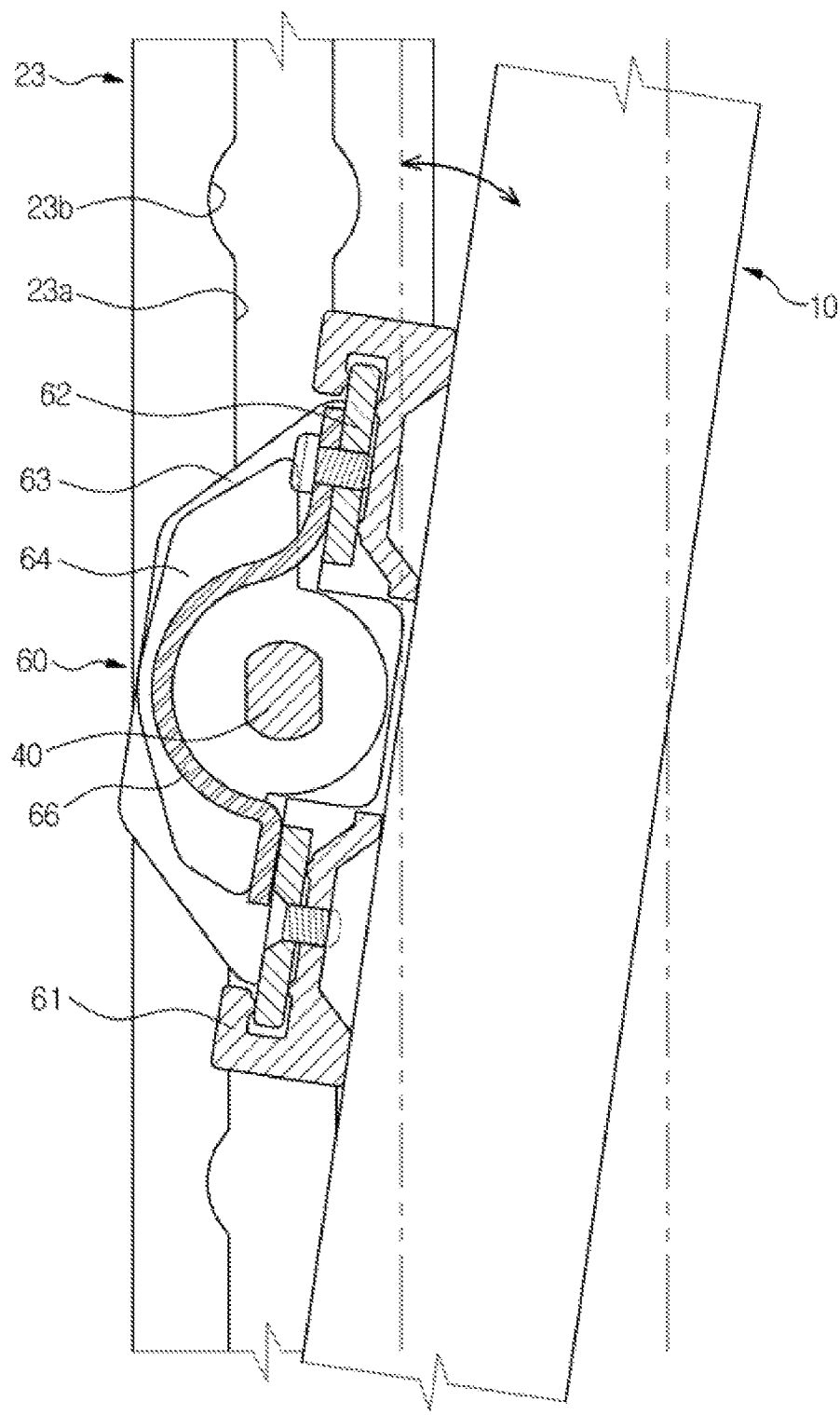
FIG. 11 is a cross-sectional view taken along line B-B of FIG. 10.

In the embodiment illustrated in FIG. 8, each of the hinge units 60 includes a fixed bracket 61 jmounted to the display unit 10, a hinge bracket 62 that is fixed to the fixed bracket 61 and includes a hinge portion 62a at which the connection shaft 40 is rotatably installed, and a friction bracket 63 installed at the fixed bracket 61 in parallel to the hinge bracket 62 to restrict the rotation of the display unit 10. In the present embodiment, the hinge bracket 62 and the friction bracket 63 are coupled with the fixed bracket 61 by sliding sideward and fixed to the display unit 10 together with the fixed bracket 61 via a bolt, or the like.

At the connection shaft 40 is installed a friction member 64 to rotate together with the connection shaft 40 and press/rub against the friction bracket 63, and the friction bracket 63 is provided with a friction portion 63a that presses/rubs against the friction member 64.

In addition, the connection shaft 40 is provided with a friction spring 65 which presses the friction member 64 toward the friction portion 63a such that the friction member 64 rubs against the friction portion 63a. As described above, when the friction member 64 is pressed toward the friction portion 63a by the friction spring 65, the rotation of the display unit 10 is prohibited/restricted by friction between the friction member 64 and the friction portion 63a, and thus, the display unit 10 does not rotate unless more than a certain amount of external force is applied. In the present embodiment, the friction spring 65 is configured in plural.

In this embodiment, the friction member 64 is in the form of a sector having a central angle of less than 180°. Thus, as the display unit 10 rotates, the friction bracket 63 rotates together with the display unit 10 and thus the display unit 10 is supported by one of opposite lateral sides of the friction member 64. Accordingly, rotation angle of the display unit 10 is restricted by the friction member 64.

The hinge unit 60 also includes a support spring 66 to elastically support the connection shaft 40. The support spring 66 is configured such that an upper end thereof is fixed to an upper portion of the friction bracket 63 which is disposed above the connection shaft 40 and a lower end thereof is in contact with a lower portion of the connection shaft 40 to elastically support the lower portion of the connection shaft 40 upward. Thus, the load of the display unit 10 is supported by the connection shafts 40 through the support springs 66. Therefore, rotation of the display unit 10 due to dead weight may be stably prevented.

In addition, the hinge unit 60 includes a pair of shaft covers 67 and 68 that are fixed to the fixed bracket 61 and cover the connection shaft 40 to prevent the connection shaft 40 from being exposed.

Figure 4:
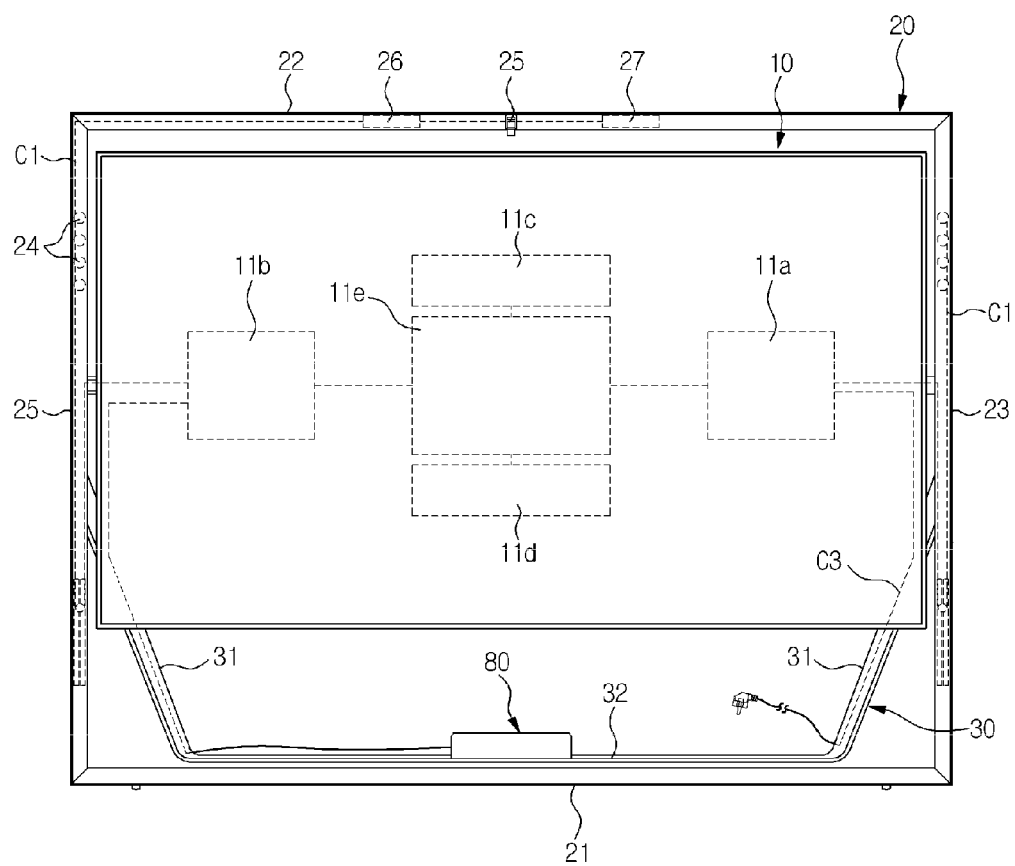
FIG. 4 is a schematic view of electronic components included in the display device according to the embodiment illustrated in FIG. 1.

In addition, as illustrated in FIG. 4, the support frame 20 is incorporated with various electronic components that interact with the display unit 10.

The electronic components incorporated with the support frame 20 include a sub-speaker 24 to generate sound by receiving electric signals from the display unit 10 such that the support frame 20 may serve as a speaker. In the present embodiment, the support frame 20 is provided at each of the opposite sides thereof, that is, at each side frame 23 thereof with the sub-speakers 24 that are disposed up and down, to aid the main speakers 13R and 13L installed at the display unit 10.

Figure 12:
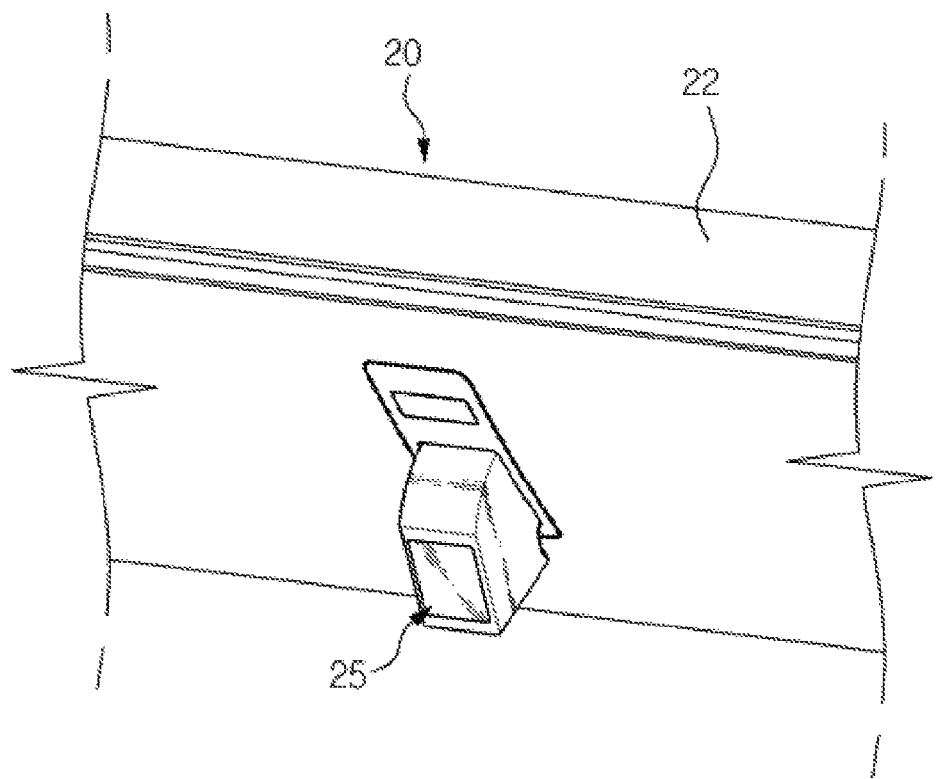
FIGS. 12 and 13 are perspective views illustrating operation of a camera included in the display device according to the embodiment illustrated in FIG. 1.
Figure 13:
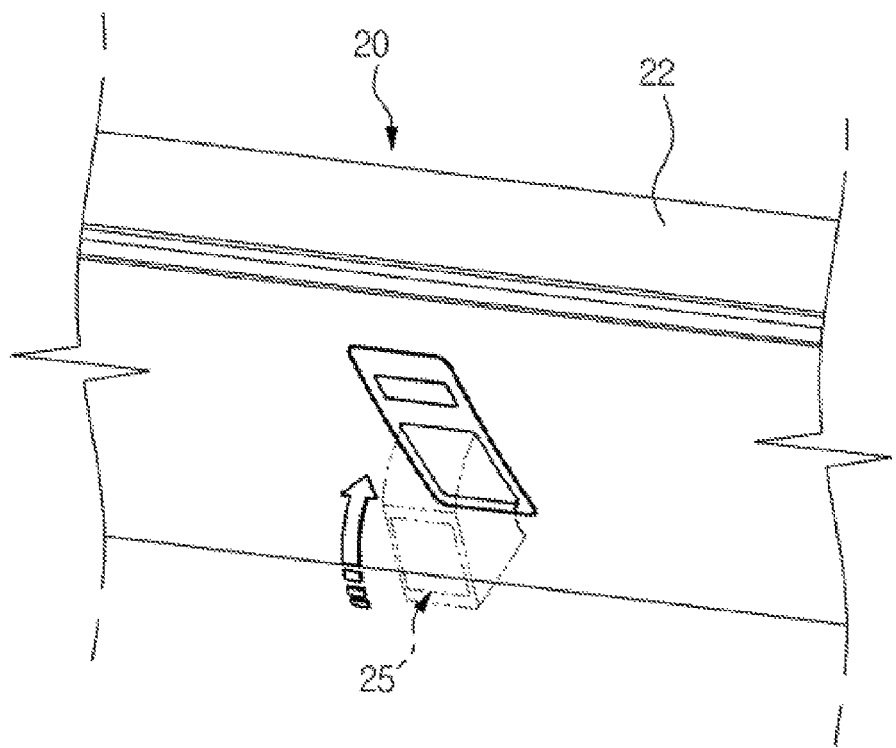

In addition, the support frame 20 includes a camera 25 so as to use a video call function via the display unit 10. In the present embodiment, as illustrated in FIGS. 12 and 13, the camera 25 is disposed at a central portion of the upper frame 22 of the support frame 20. In addition, the camera 25 is rotatably installed at the support frame 20 such that the camera 25 protrudes from the support frame 20 while rotating. Thus, when the camera 25 is not needed, the camera 25 is accommodated in the support frame 20 as illustrated in FIG. 12, and, when the camera 25 is needed for the video call function, the camera 25 may protrude from the support frame 20 as illustrated in FIG. 13.

In addition, the support frame 20 is incorporated with a WIFI module 26 to enable the display device to perform the Internet access in a wireless scheme, and a Bluetooth module 27 configured to enable the display device to perform a wireless communication with an external device. In the present embodiment, the WIFI module 26 and the Bluetooth module 27 are built in the upper frame 22.

As described above, the support frame 20 is provided with the sub-speaker 24, the camera 25, the WIFI module 26 and the Bluetooth module 27 installed therein while having the input/output unit 80 detachably installed at the support portion 32. The components as such are connected to the circuit board 11, included in the display unit 10, through various types of cables C1, C2 and C3.

The cables C1, C2 and C3 include a connection C1 extending through the hinge unit 60 to connect the circuit boards 11 installed on the display unit 10 to the sub-speaker 24, the camera 25, the WIFI module 26 and the Bluetooth module 27 built in the support frame 20, a power cable C3 extending from the display unit 10 to supply the display device with power, and an input/output cable C2 extending from the display unit 10 to connect the circuit boards 11 to the input/output unit 80.

The connection cable C1 among the cables C1, C2 and C3, as described above, extends from the circuit board 11 through the hinge unit 60 to the inside the support frame 20 so as to be connected to the sub-speaker 24, the camera 25, the WIFI module 26 and the Bluetooth module 27.

Figure 14:
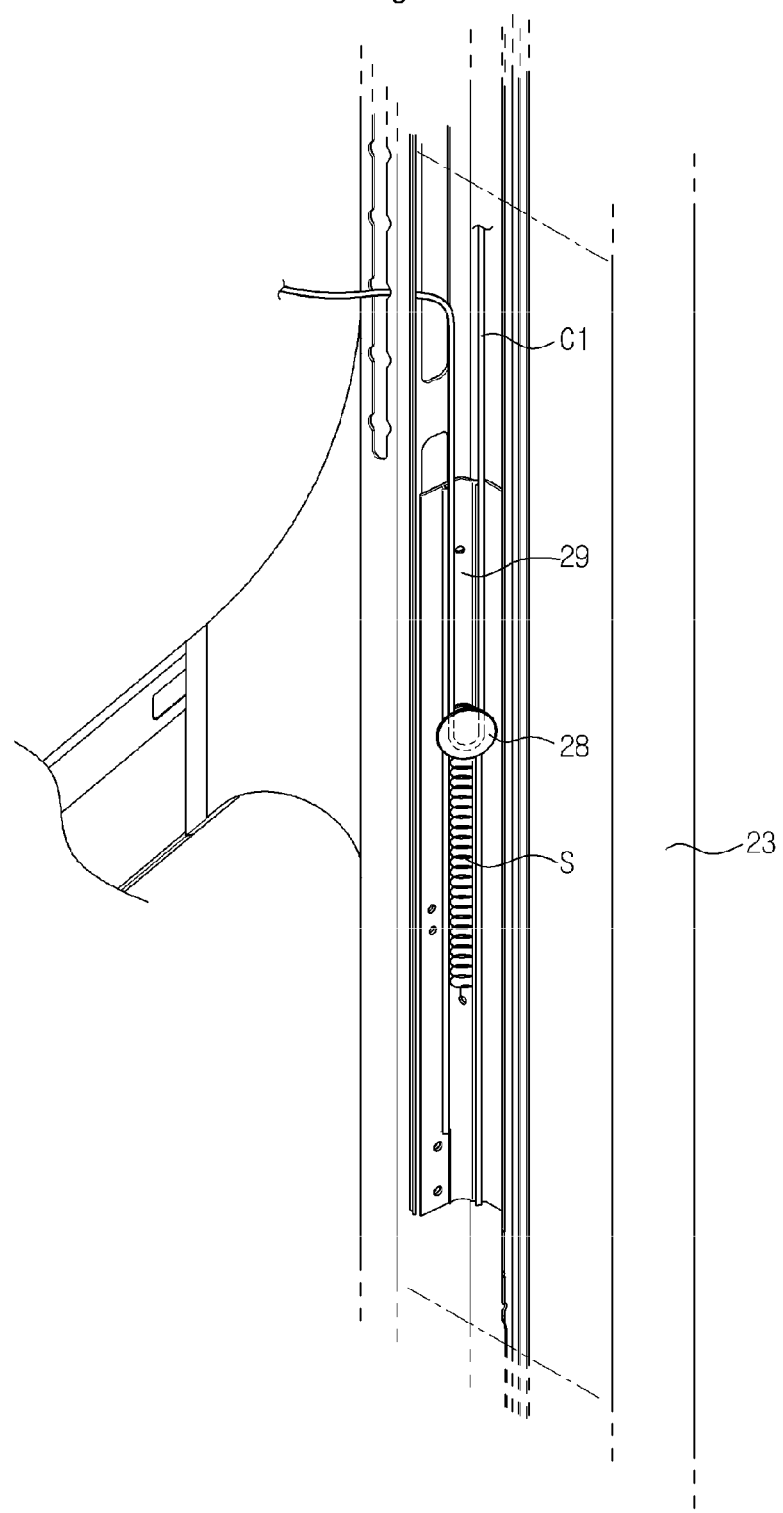
FIG. 14 is a perspective view of a cable supporting structure included in the display device illustrated in FIG. 1.

In this case, the connection cable C1 is provided in a predetermined length having a margin corresponding to the up and down movement of the display unit 10. Such a margin of the connection cable C1 may prevent the up and down movement of the display unit 10. In order to prevent the connection cable C1 from being tangled, as shown in FIG. 14, the support frame 20 is provided at an inside thereof with a bobbin 28 around which the connection cable C1 is wound, a bobbin guide rail 29 on which the bobbin 28 is installed movably up and down, and an elastic member S elastically supporting the bobbin 28 downward and keep the bobbin 28 in a state of being moved downward.

Accordingly, since the bobbin 28 moves up and down along the bobbin guide rail 29 while interacting with the up and down movement of the display unit 10, the connection cable C1 wound around the bobbin 28 is kept stretched up and down all the times, thereby preventing the connection cable C1 from being tangled.

In addition, if the power cable C3 and the input/output cable C2 among the above described cables C1, C2 and C3, which extend from the display unit 10, are directly let down from the display unit 10, the external appearance of the display device is lowered.

Figure 15:
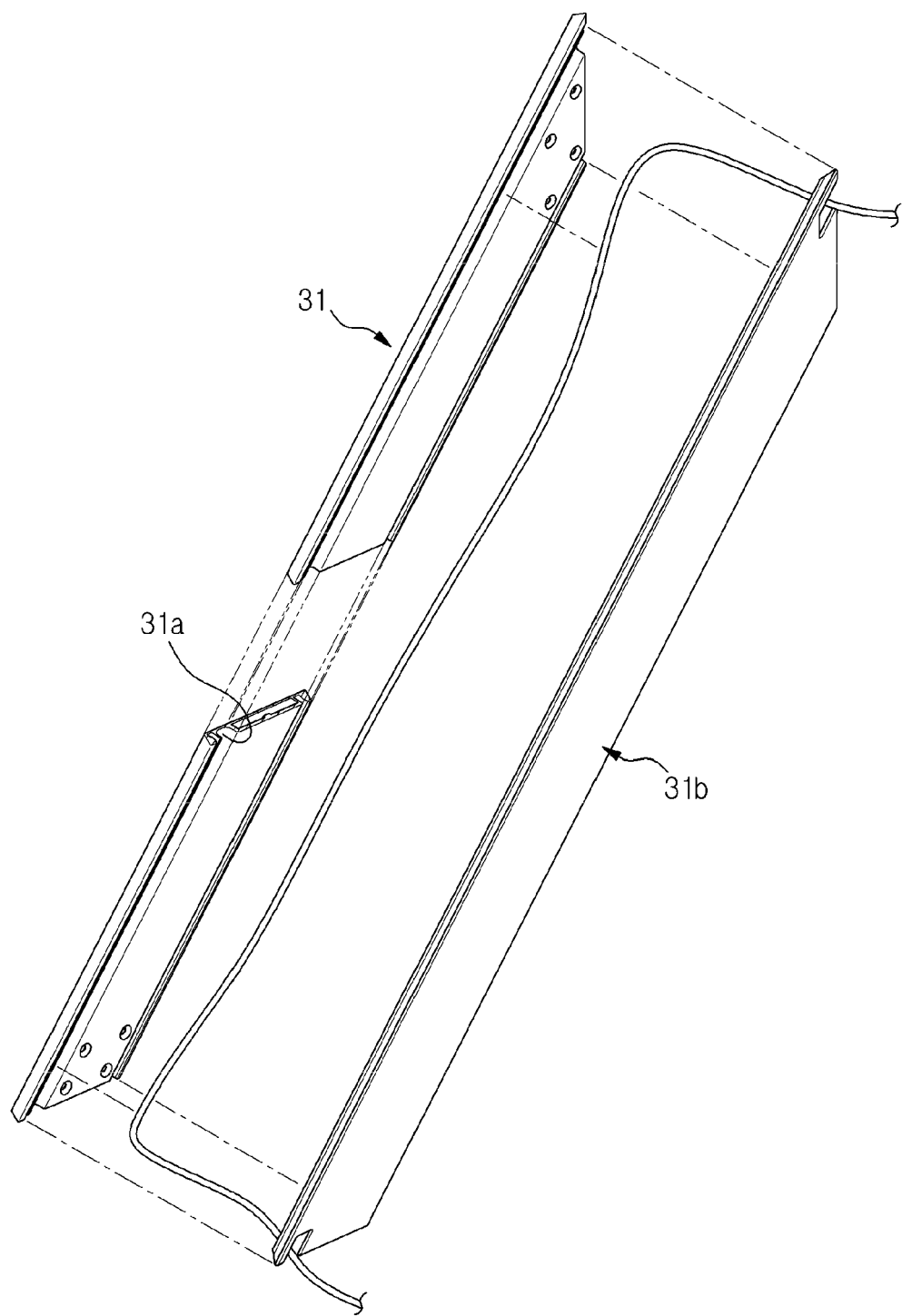
FIG. 15 is a perspective view showing a cable accommodating structure included in the display device illustrated in FIG. 1.

Accordingly, as shown in FIG. 15, the two extension portions 31 of the leg 30 are respectively provided with cable accommodating grooves 31a, in which the power cable C3 and the input/output cable C2 are accommodated, and with cable covers 31b to cover the cable accommodation grooves 31a. Accordingly, the power cable C3 and the input/output cable C2 are installed in the cable accommodating grooves 31a, and as the cable covers 31b cover the cable accommodating grooves 31a, a portion of the power cable C3 and a portion of the input/output cable C2 are accommodated at an inside of the extension portion 31, thereby preventing the external appearance of the display device from being degraded due to the power cable C3 and the input/output cable C2.

Figure 16:
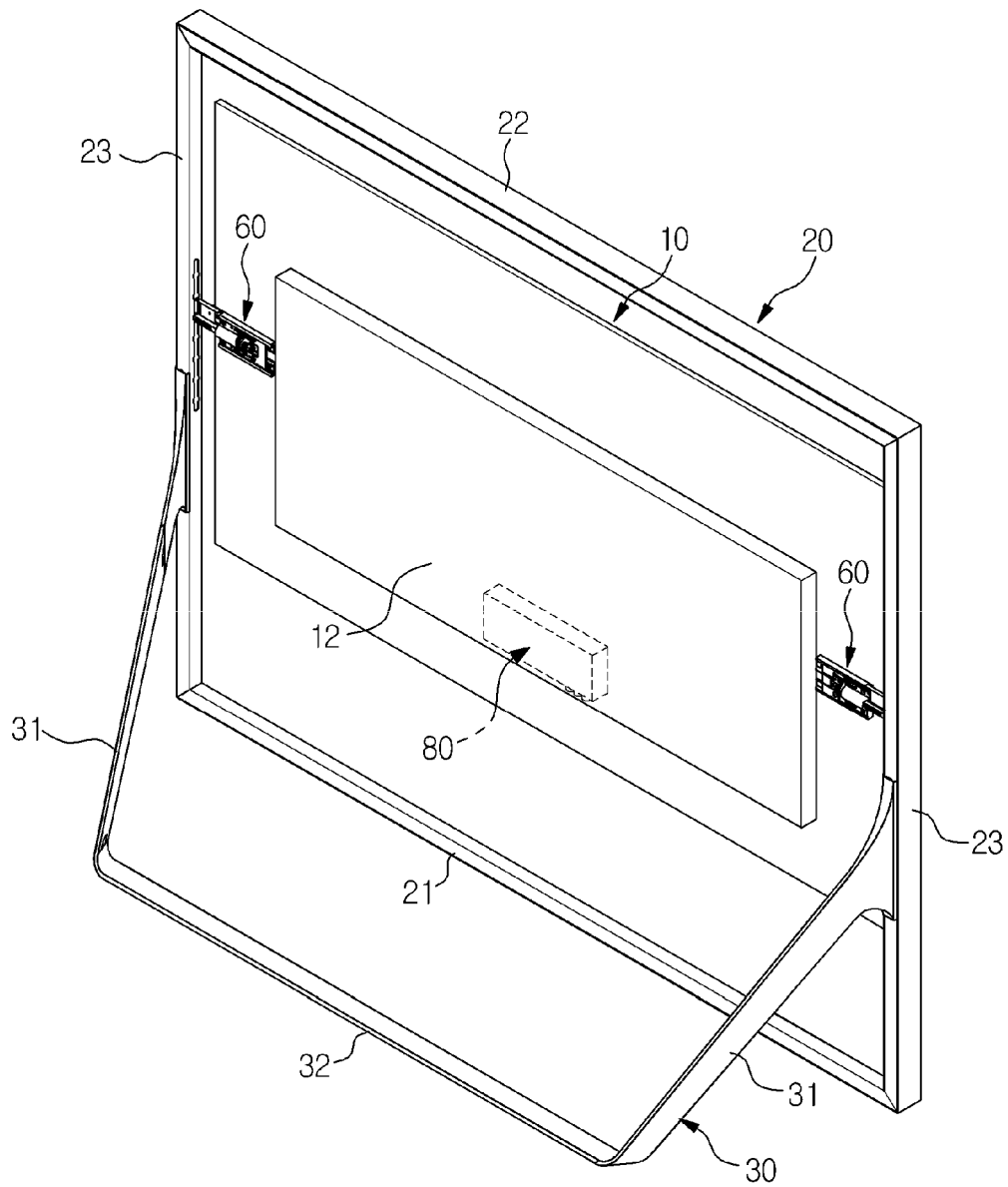
FIG. 16 is a rear side perspective view of a display device according to another embodiment.
Figure 17:
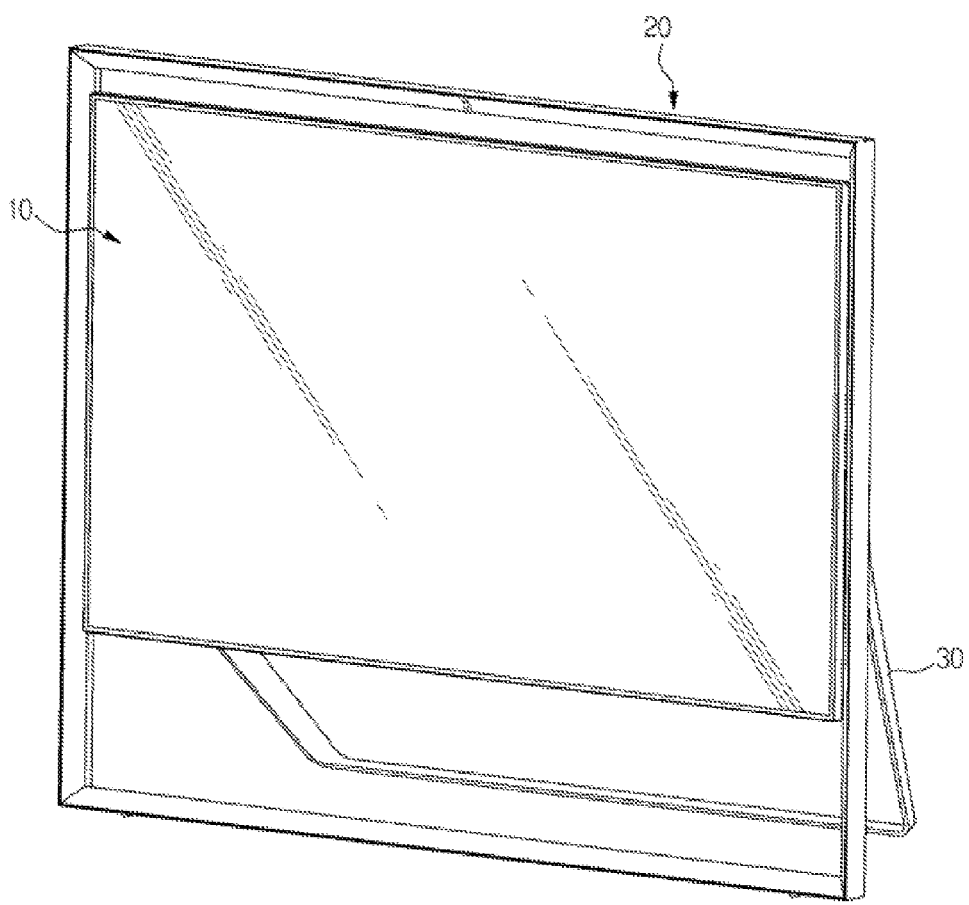
FIG. 17 is a perspective view of a display device according to another embodiment.
Figure 18:
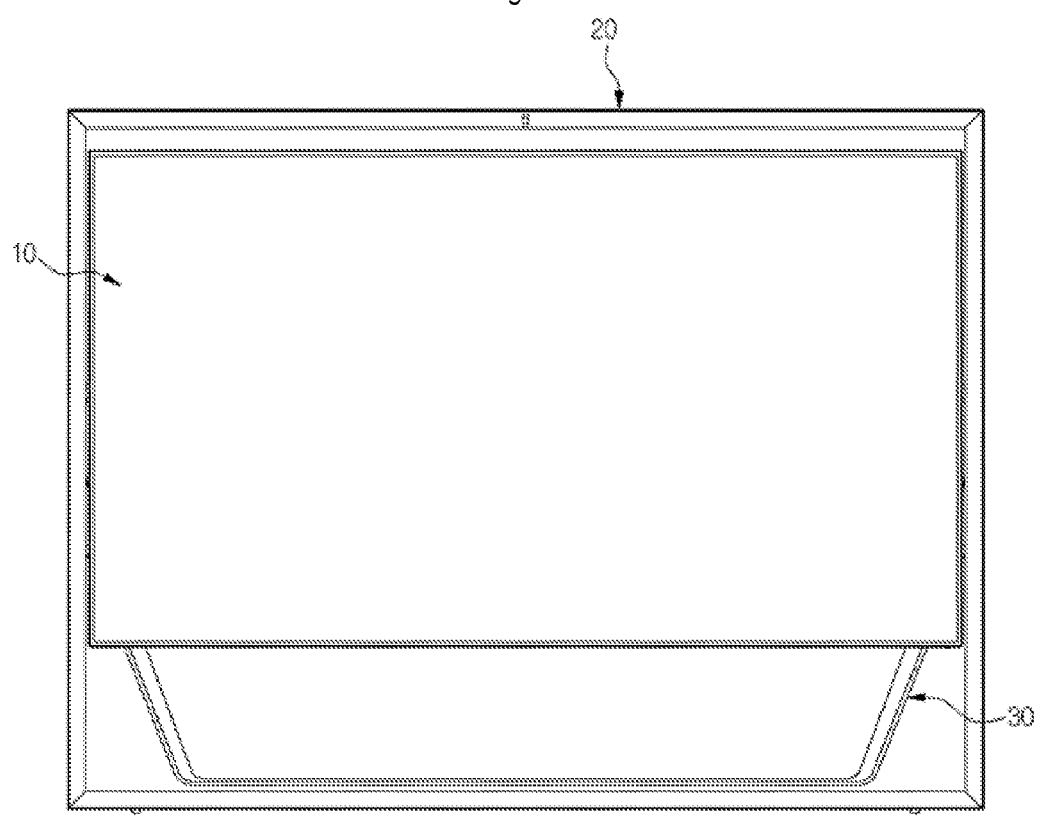
FIG. 18 is a front view of the display device according to the embodiment illustrated in FIG. 17.
Figure 19:
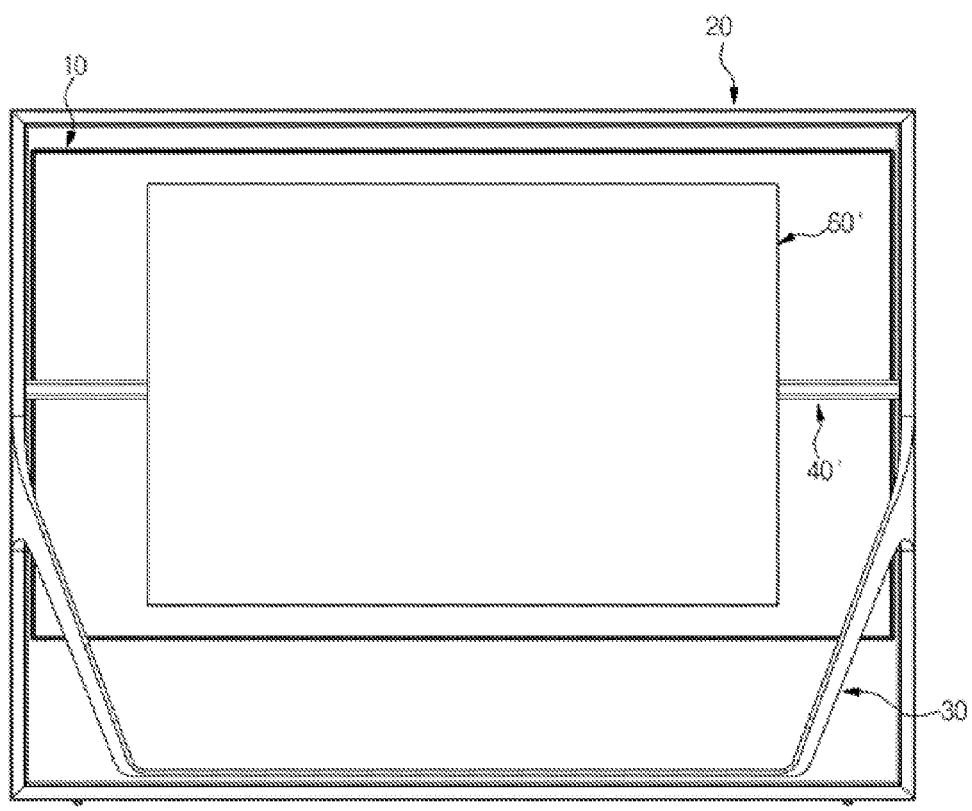
FIG. 19 is a rear view of the display device according to the embodiment illustrated in FIG. 17.
Figure 20:
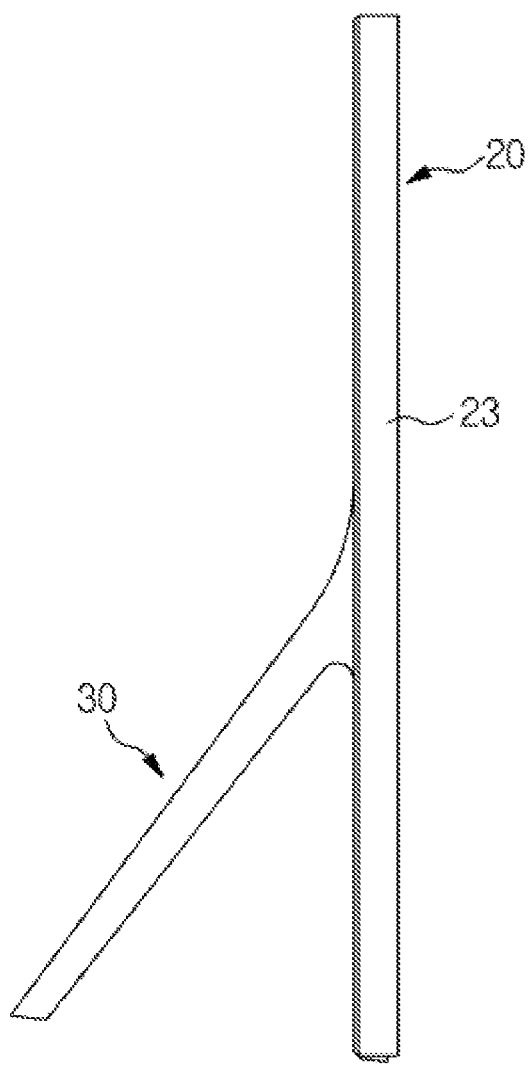
FIG. 20 is a left side view of the display device according to the embodiment illustrated in FIG. 17.
Figure 21:
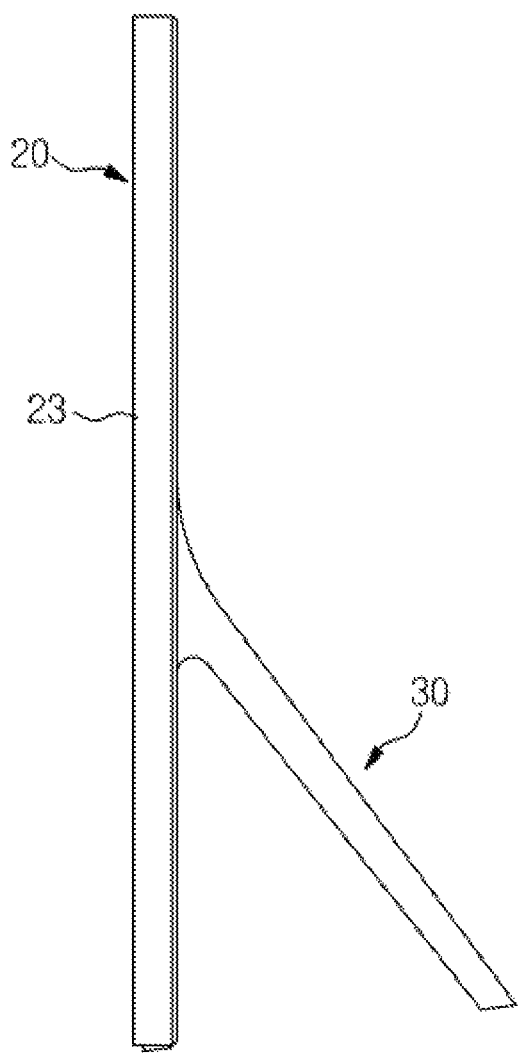
FIG. 21 is a right side view of the display device according to the embodiment illustrated in FIG. 17.
Figure 22:
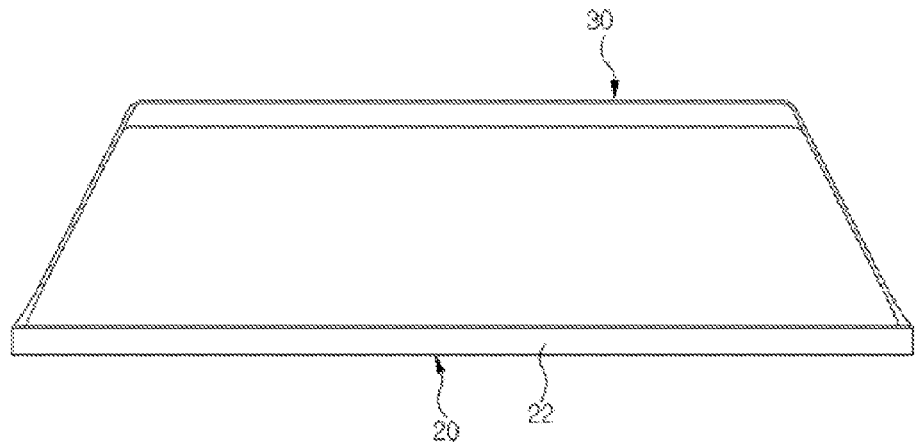
FIG. 22 is a plan view of the display device according to the embodiment illustrated in FIG. 17.
Figure 23:
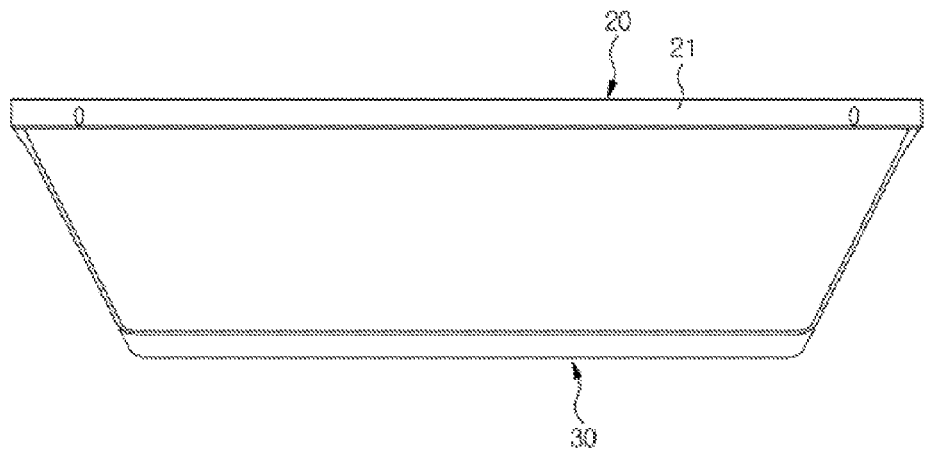
FIG. 23 is a bottom view of the display device according to the embodiment illustrated in FIG. 17.
Figure 24:
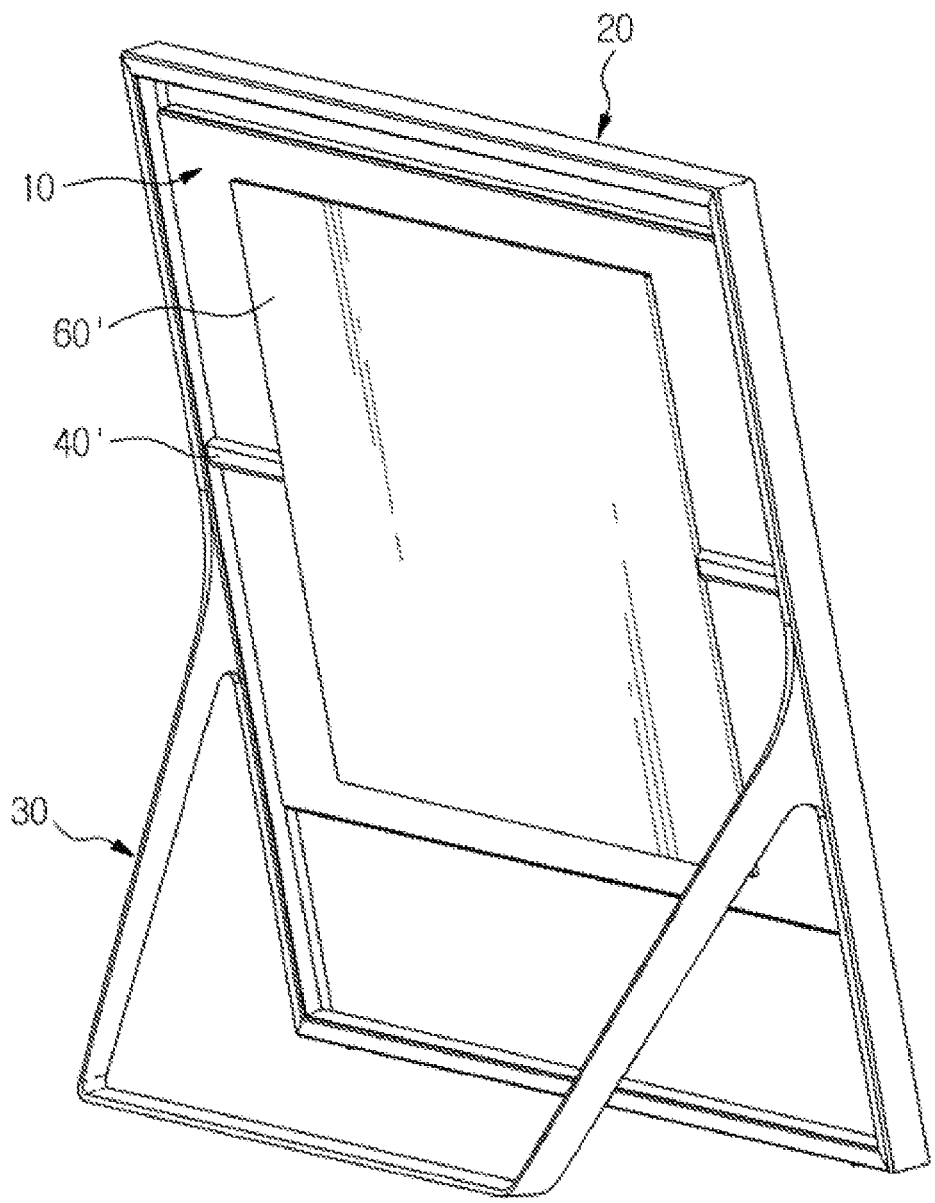
FIG. 24 is a rear perspective view of the display device according to the embodiment illustrated in FIG. 17.
Figure 25:
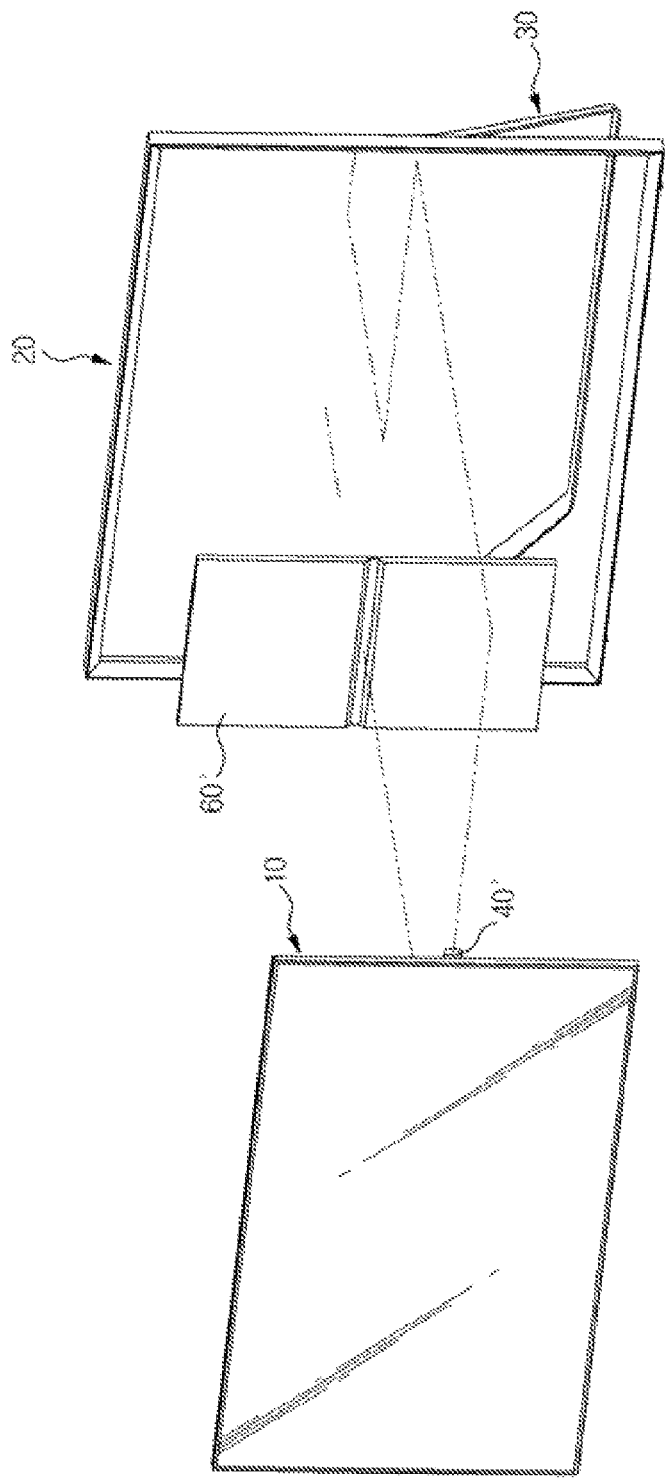
FIG. 25 is an exploded perspective view of the display device according to the embodiment illustrated in FIG. 12.
Figure 26:
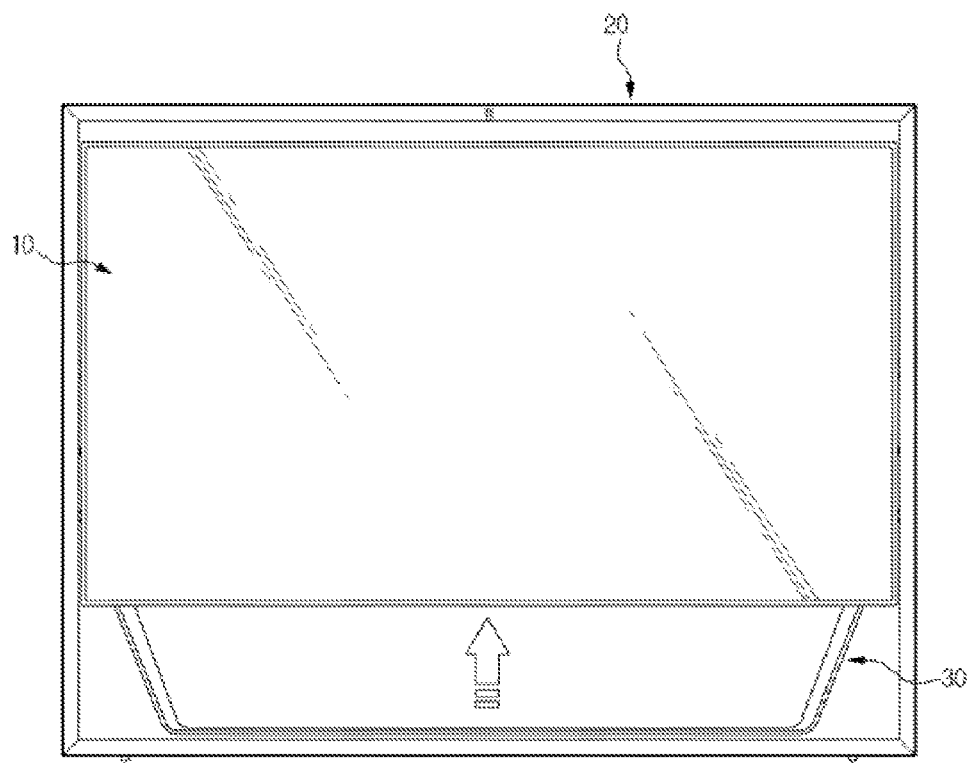
FIGS. 26 and 27 are front views illustrating upward and downward movements of a display unit of the display device according to the embodiment illustrated in FIG. 17.
Figure 27:
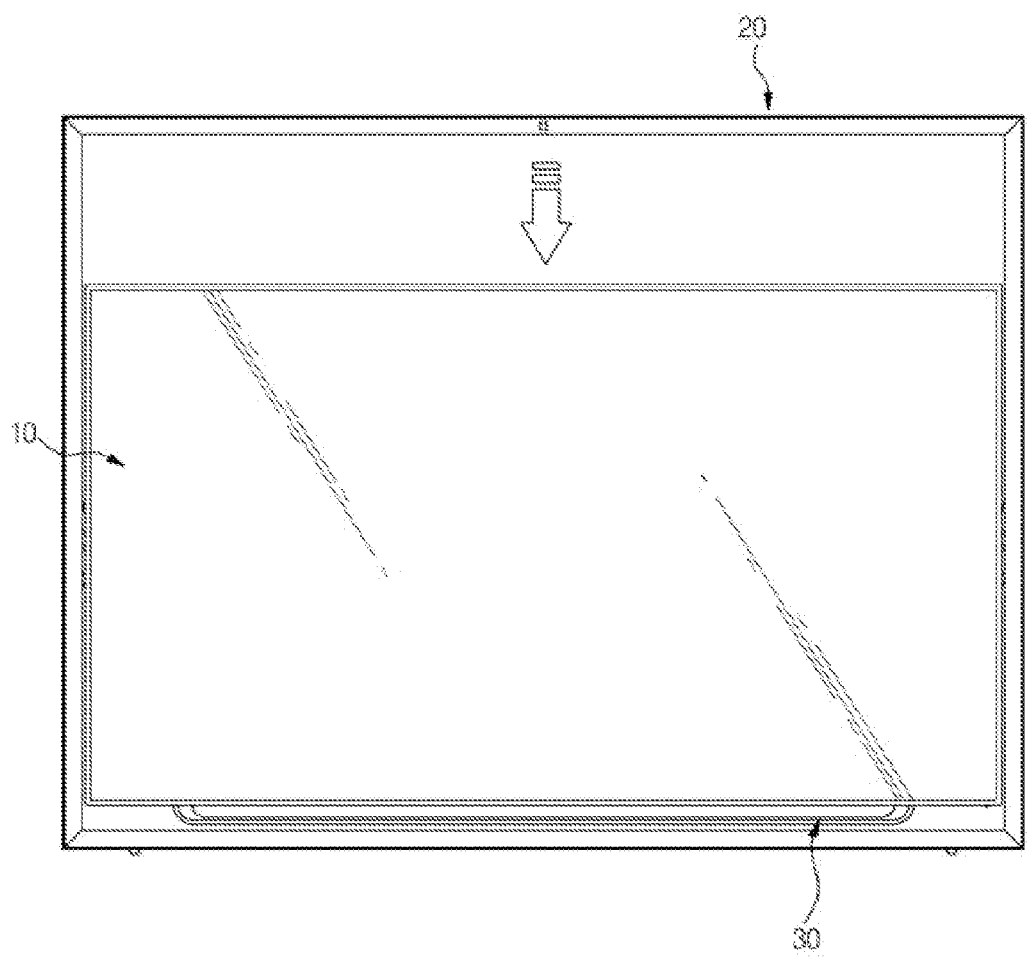
Figure 28:
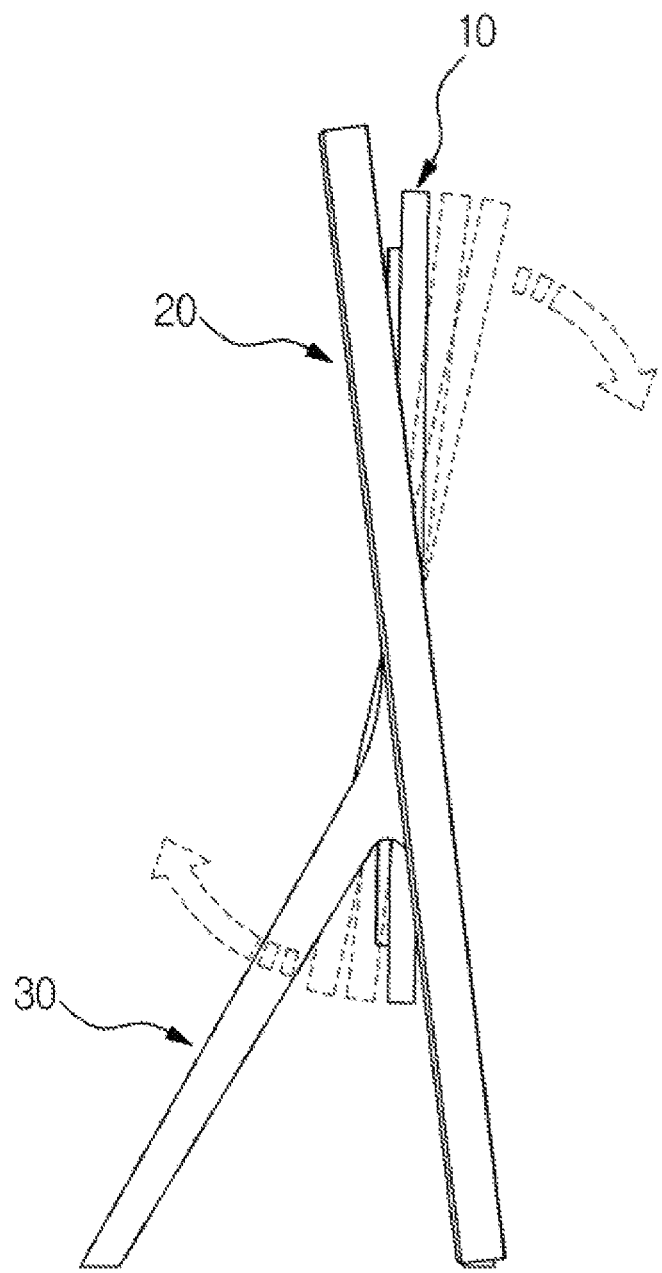
FIGS. 28 and 29 are side views illustrating forward and backward rotation of the display device according to the embodiment illustrated in FIG. 17.
Figure 29:
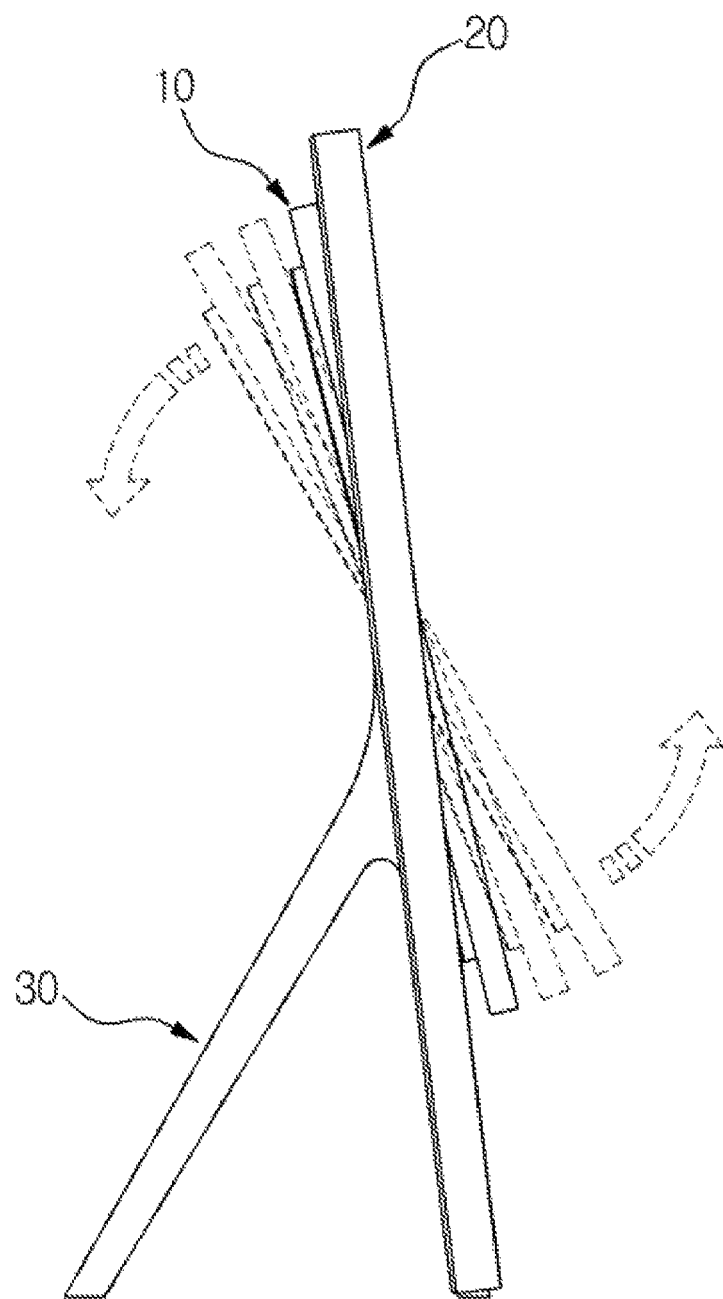
Figure 30:
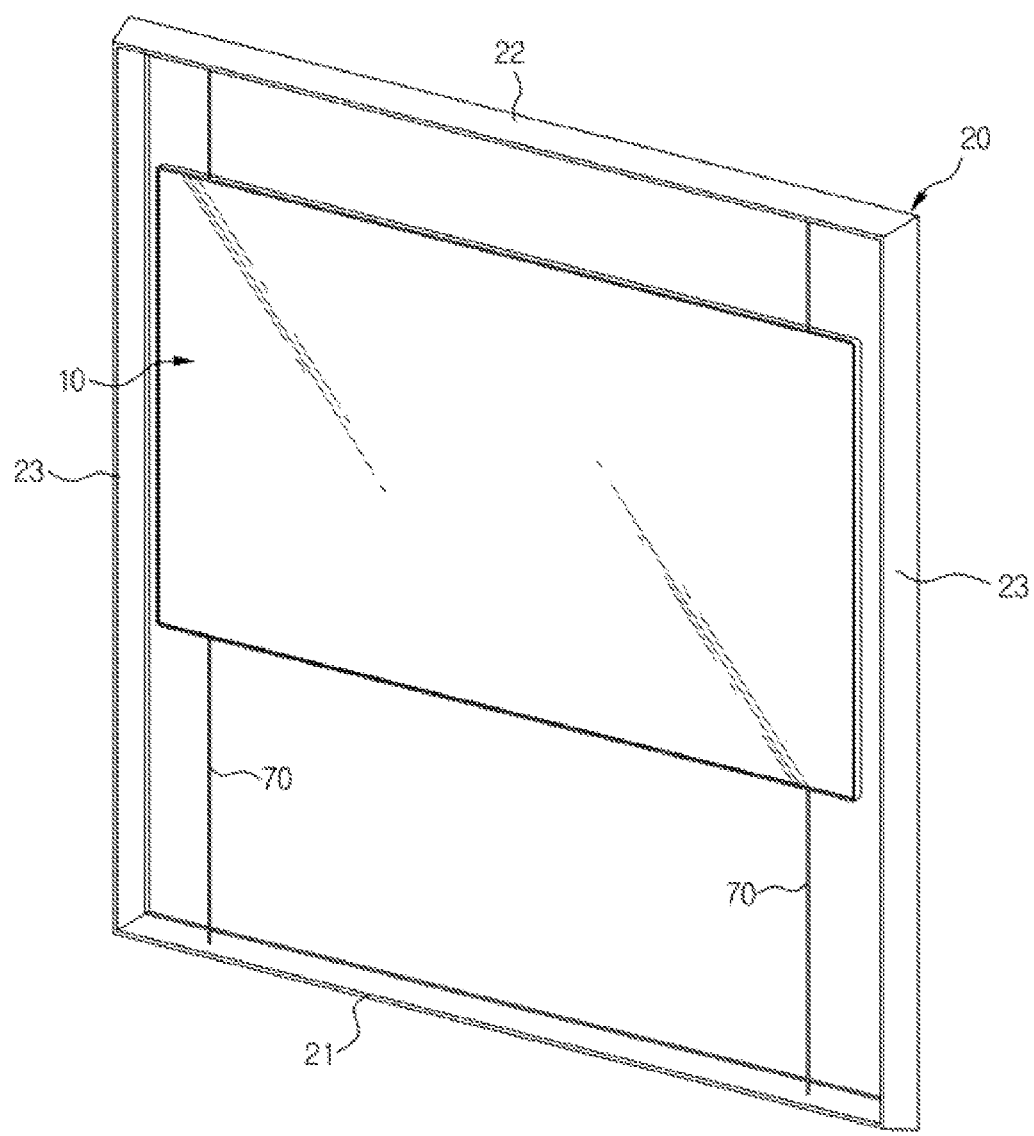
FIG. 30 is a perspective view of a display device according to another embodiment.
Figure 31:
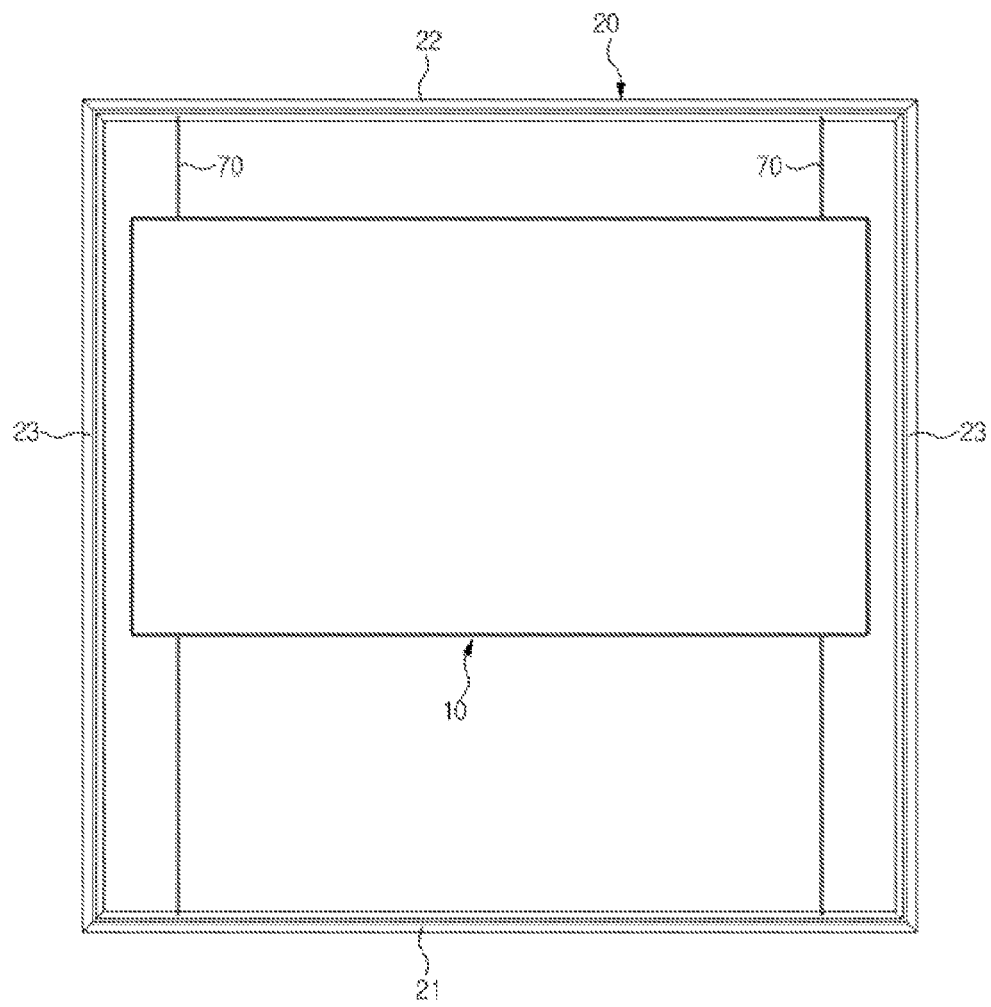
FIG. 31 is a front view of the display device according to the embodiment illustrated in FIG. 30.
Figure 32:
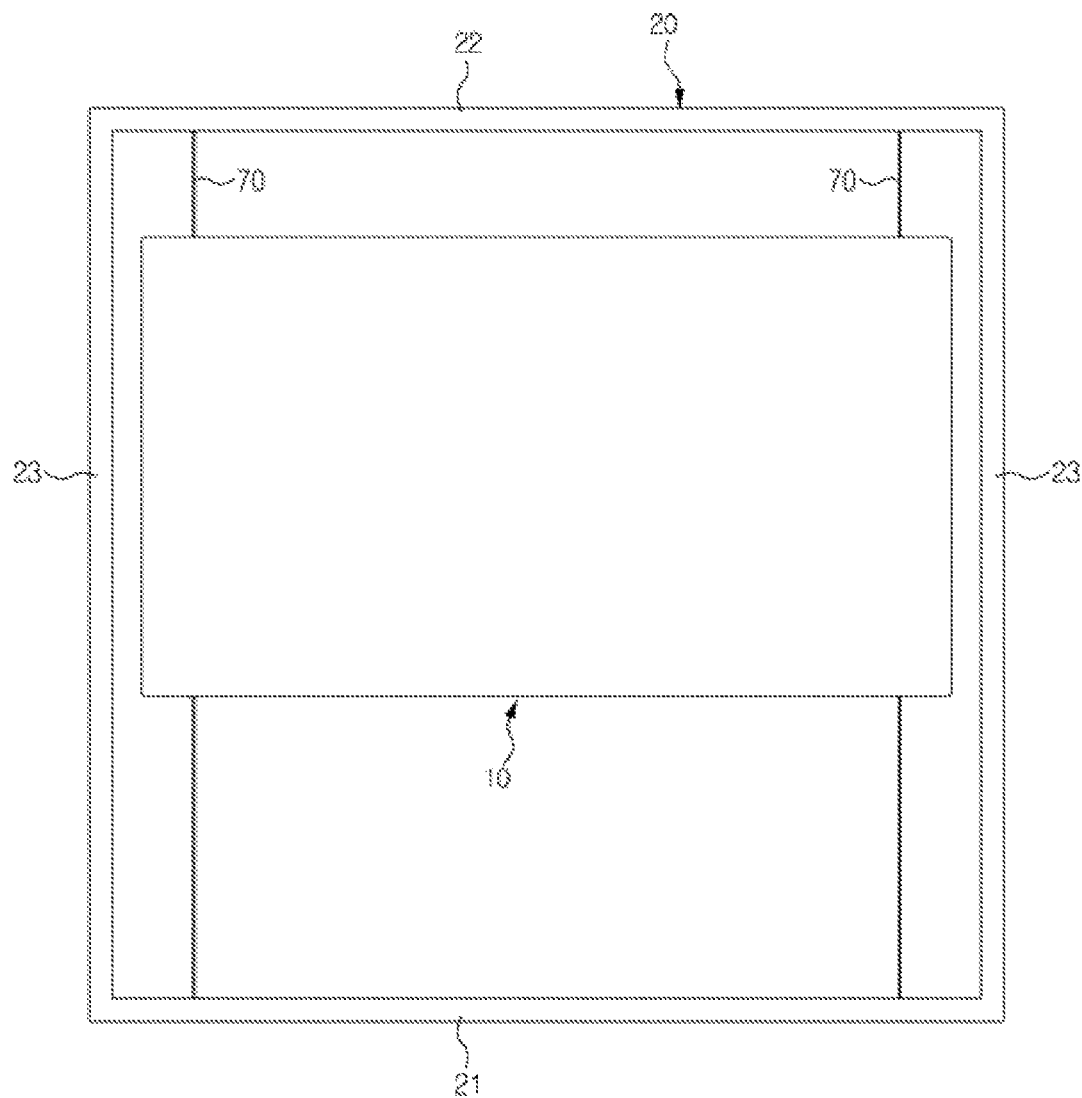
FIG. 32 is a rear view of the display device according to the embodiment illustrated in FIG. 30.
Figure 33:
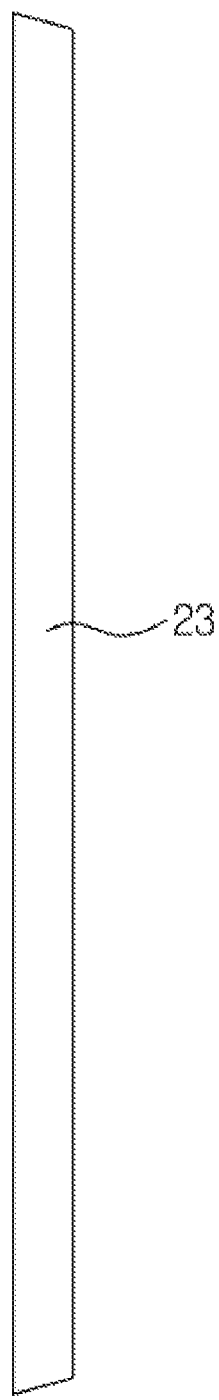
FIG. 33 is a side view of the display device according to the embodiment illustrated in FIG. 30.
Figure 34:
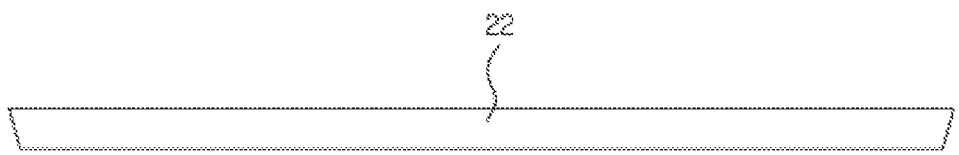
FIG. 34 is a plane view of the display device according to the embodiment illustrated in FIG. 30.
Figure 35:
FIG. 35 is a bottom view of the display device according to the embodiment illustrated in FIG. 30.
Figure 36:
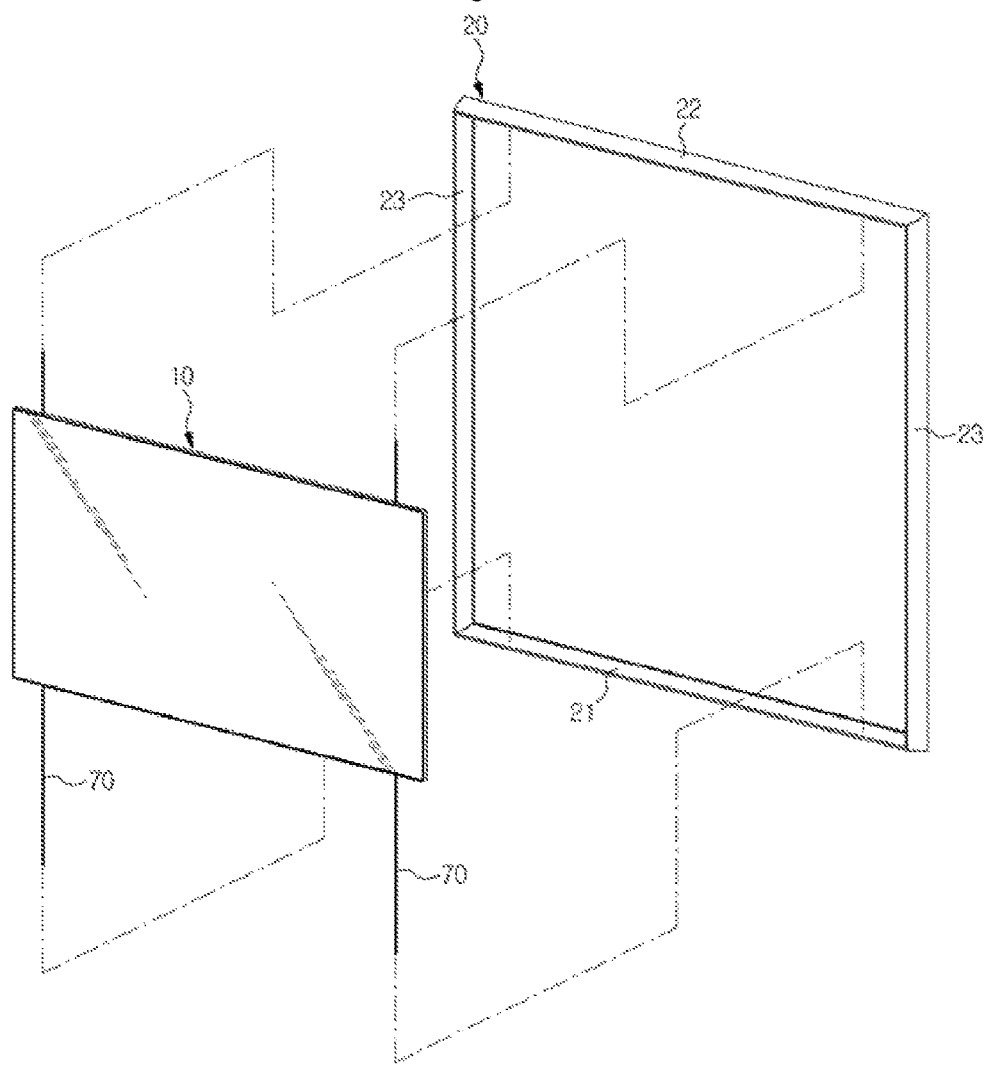
FIG. 36 is an exploded perspective view of the display device according to the embodiment illustrated in FIG. 30.
Figure 37:
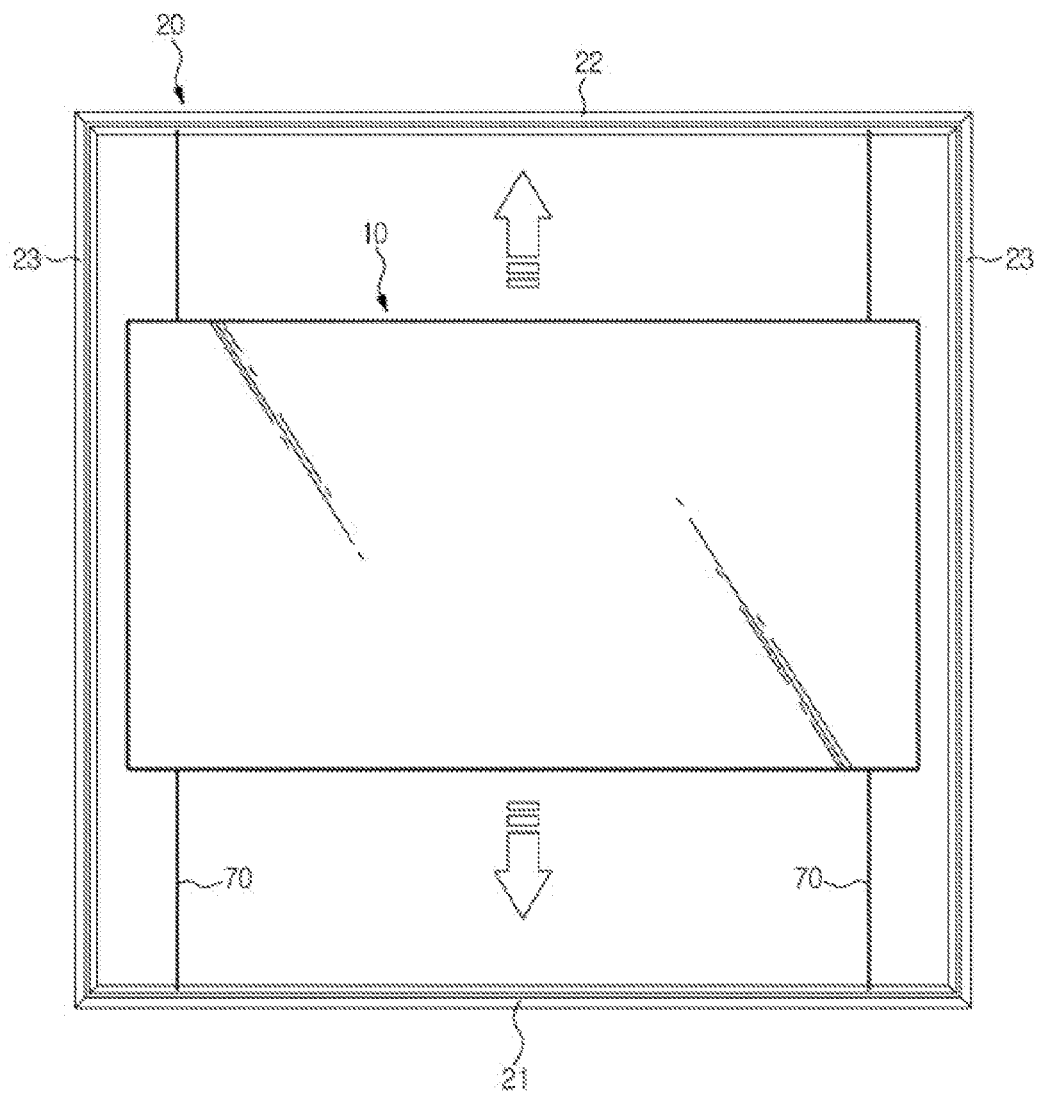
FIGS. 37 and 38 are front views illustrating upward and downward movements of the display device according to the embodiment illustrated in FIG. 25.
Figure 38:
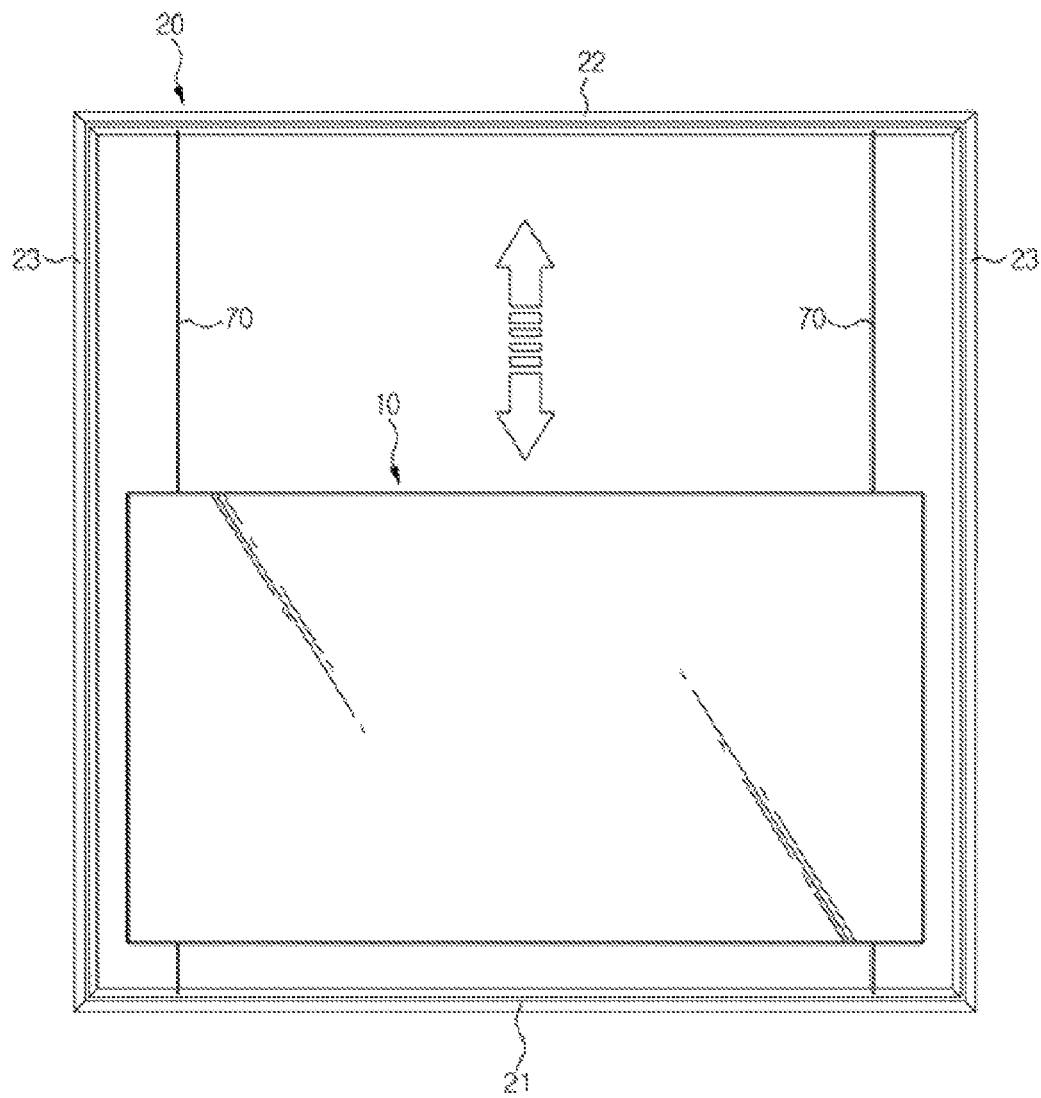
Figure 39:
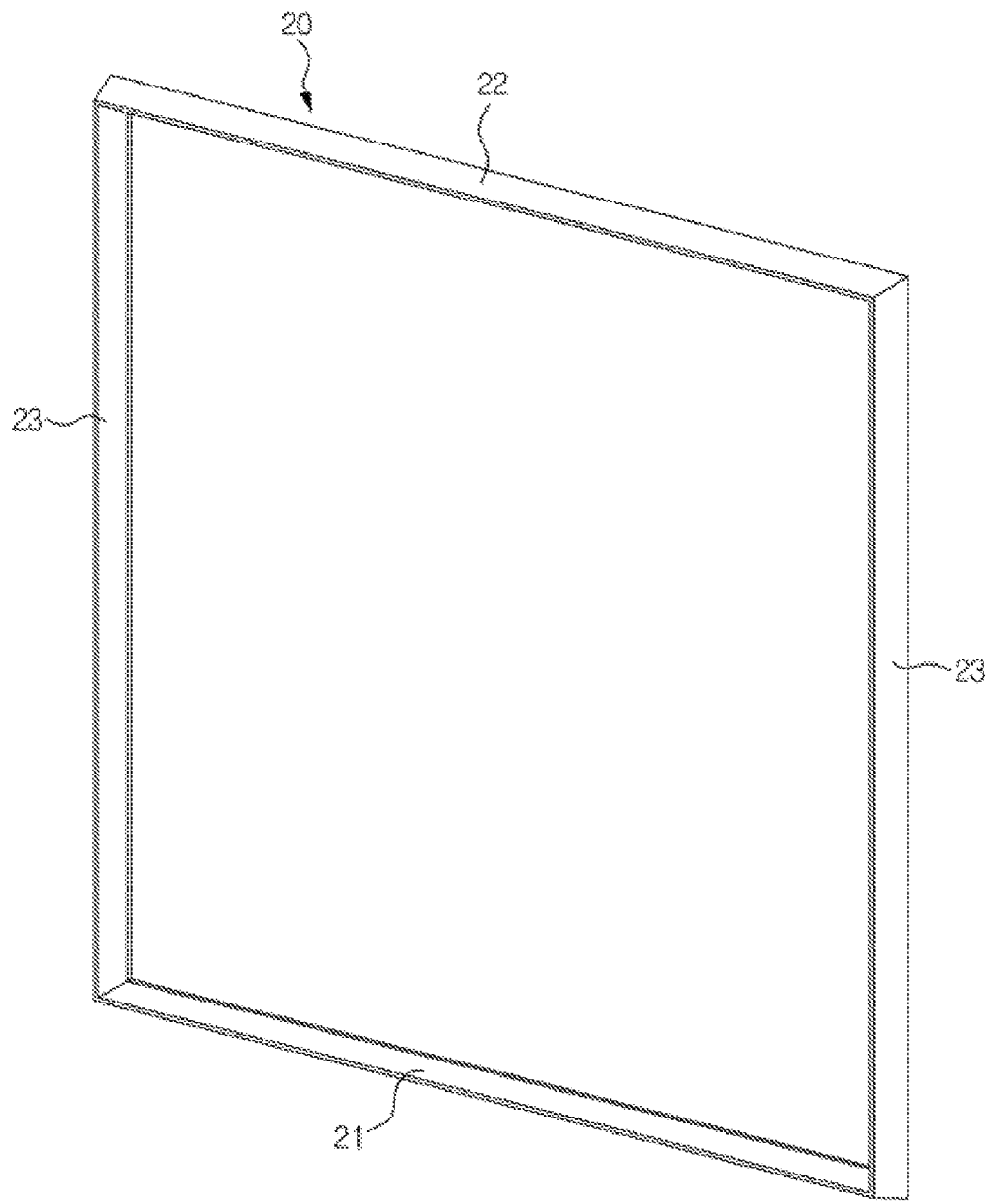
FIG. 39 is a perspective view of a support frame included in the display device according to the embodiment illustrated in FIG. 30.
Figure 40:
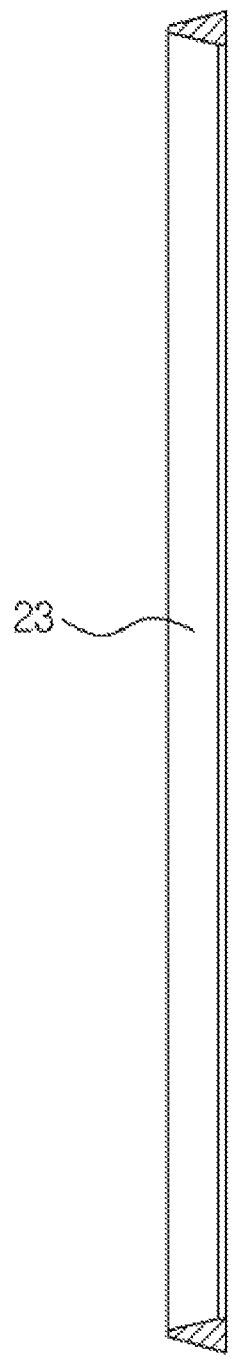
FIG. 40 is a perspective view of a side frame included in the display device according to the embodiment illustrated in FIG. 30.
Figure 41:
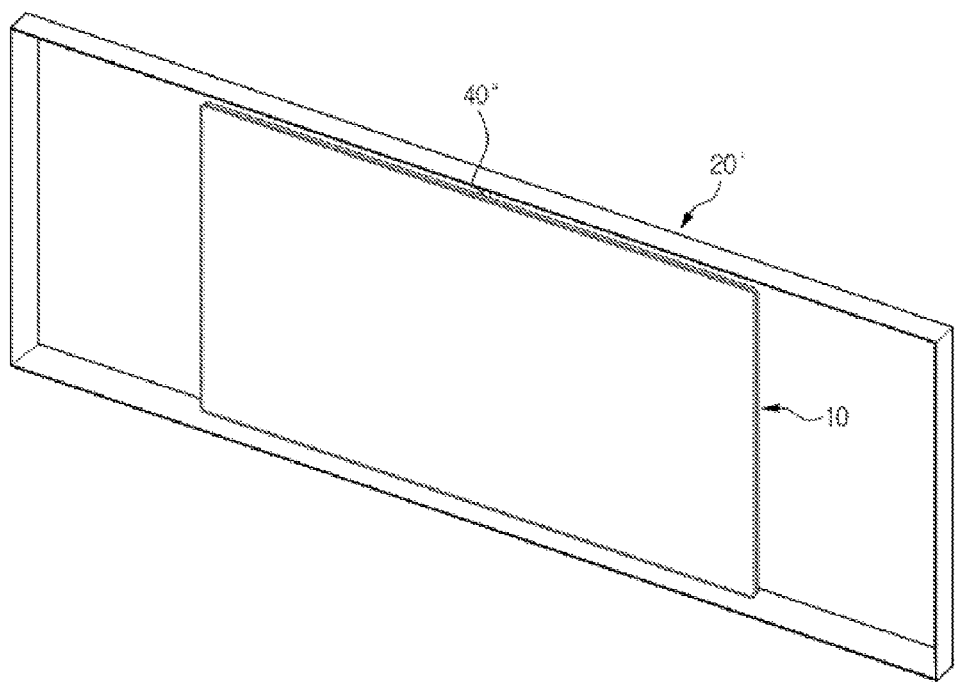
FIG. 41 is a perspective view of a display device according to another embodiment.
Figure 42:
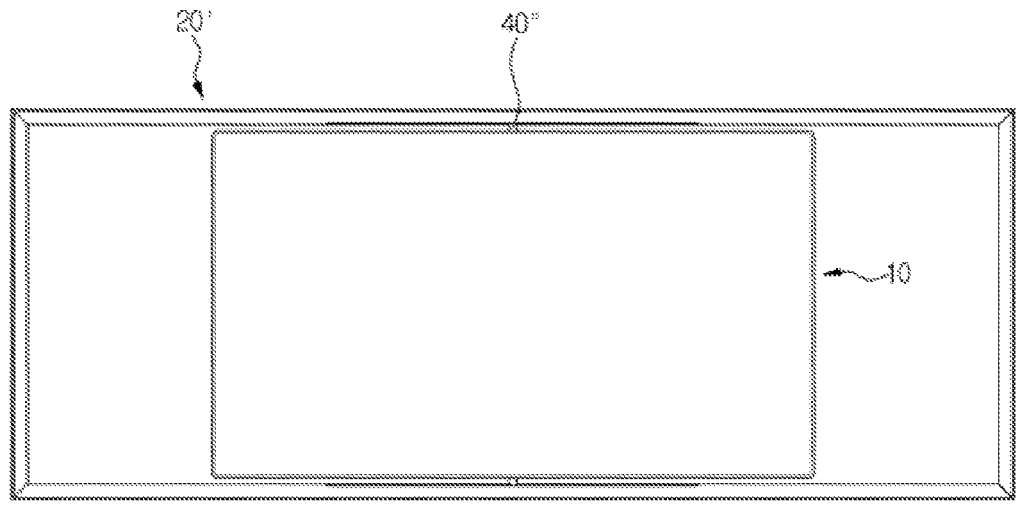
FIG. 42 is a front view of the display device according to the embodiment illustrated in FIG. 41.
Figure 43:
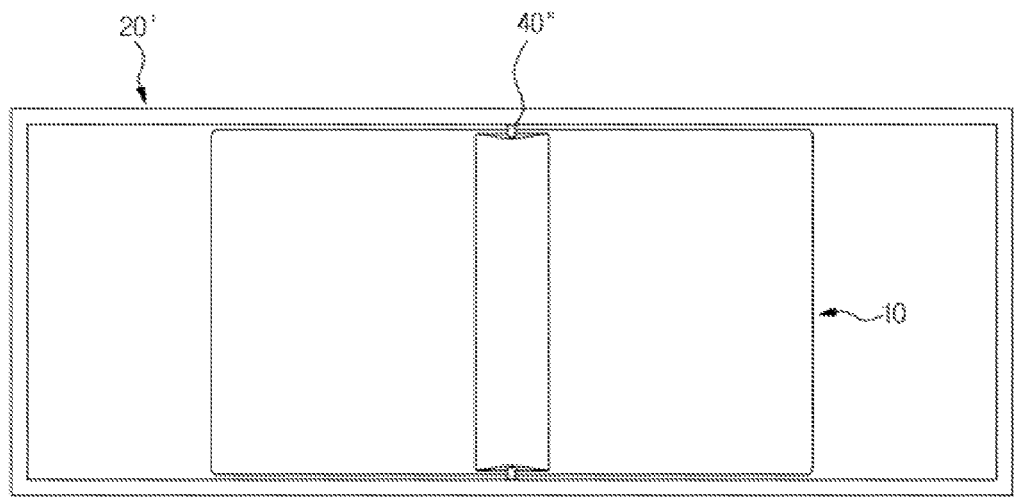
FIG. 43 is a rear view of the display device according to the embodiment illustrated in FIG. 41.
Figure 44:
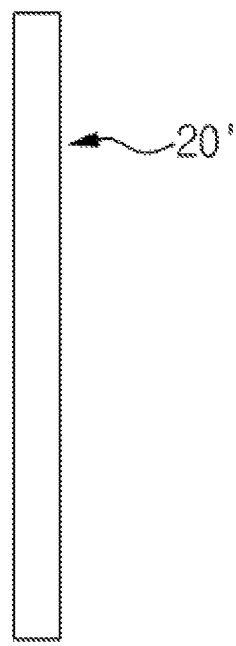
FIG. 44 is a left side view of the display device according to the embodiment illustrated in FIG. 41.
Figure 45:
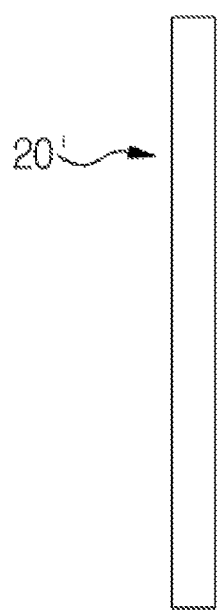
FIG. 45 is a right side view of the display device according to the embodiment illustrated in FIG. 41.
Figure 46:
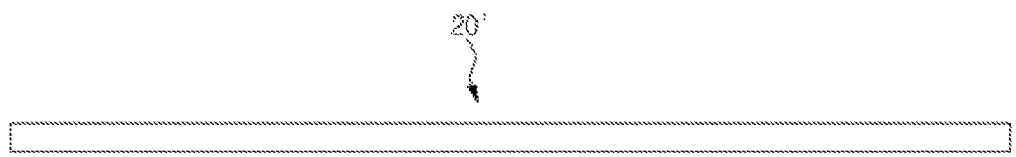
FIG. 46 is a plan view of the display device according to the embodiment illustrated in FIG. 41.
Figure 47:
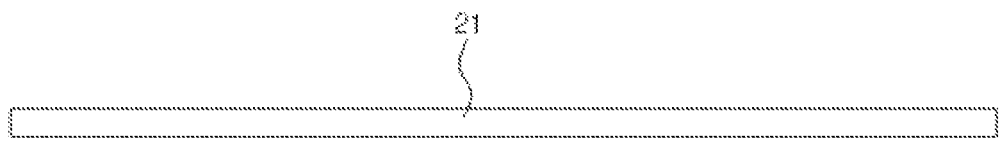
FIG. 47 is a bottom view of the display device according to the embodiment illustrated in FIG. 41.
Figure 48:
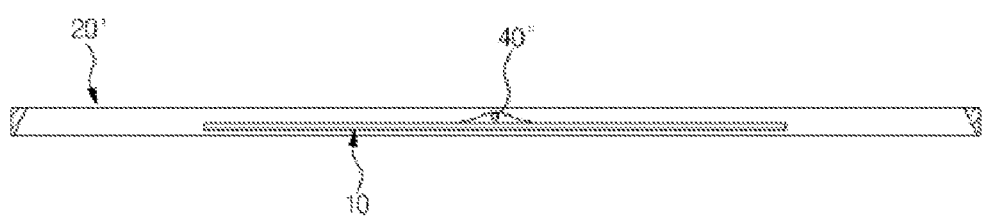
FIG. 48 is a horizontal sectional view of the display device according to the embodiment illustrated in FIG. 41.
Figure 49:
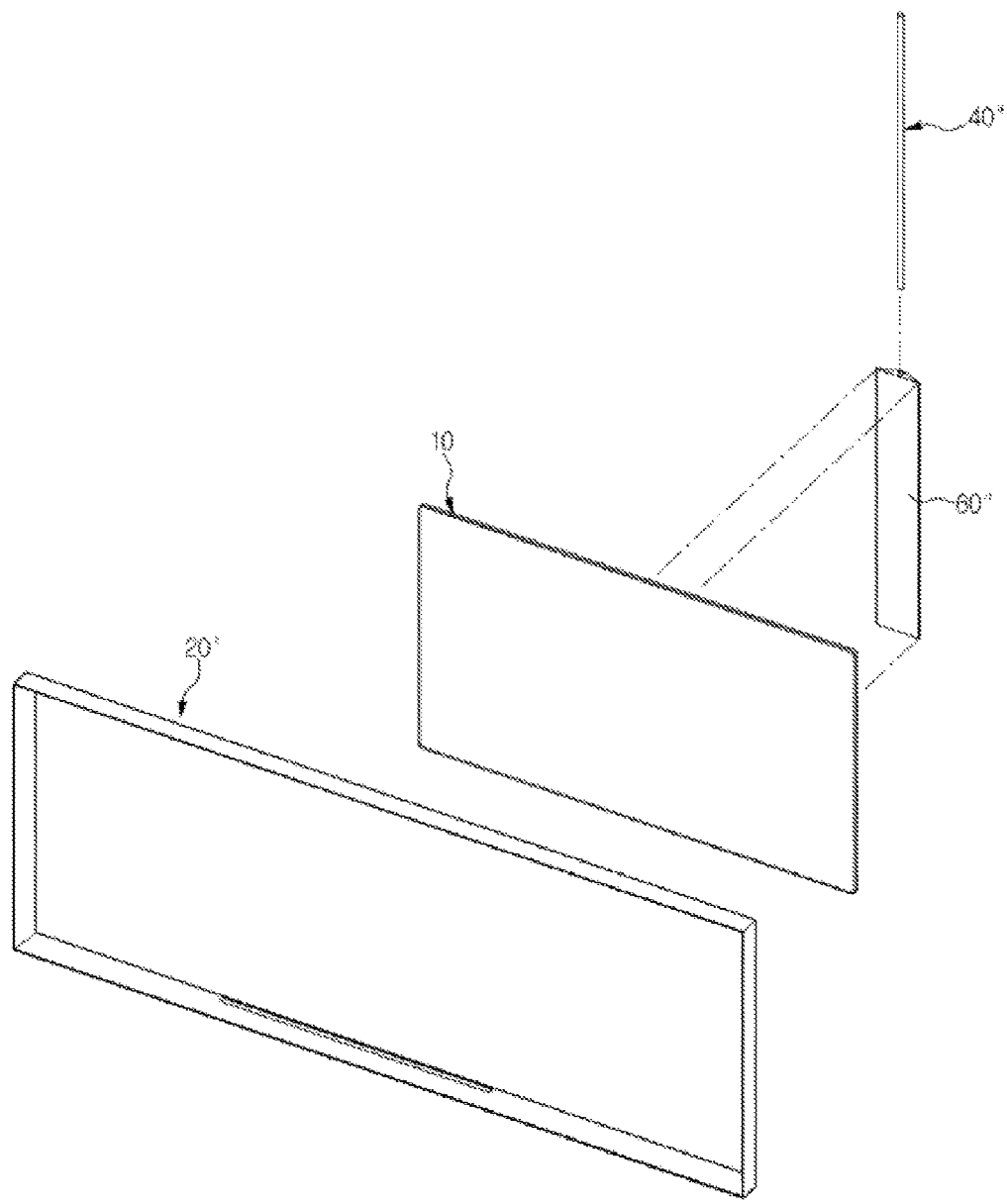
FIG. 49 is an exploded perspective view of the display device according to the embodiment illustrated in FIG. 41.
Figure 50:
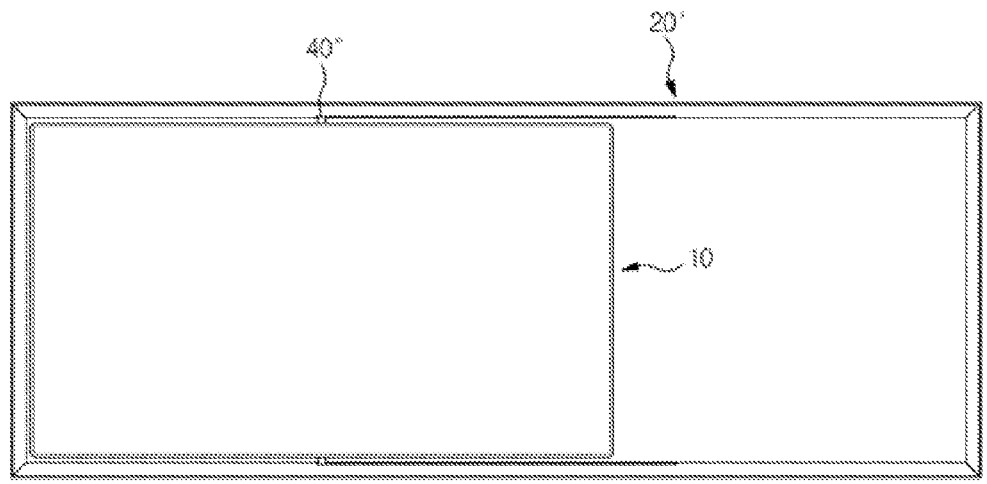
FIGS. 50 and 51 are front views illustrating right and left movements of a display unit of the display device according to the embodiment illustrated in FIG. 41.
Figure 51:
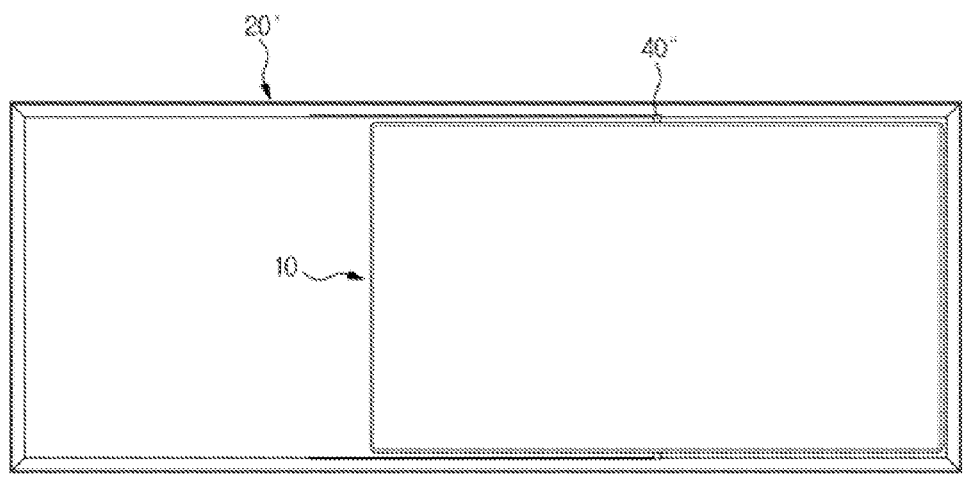
Figure 52:
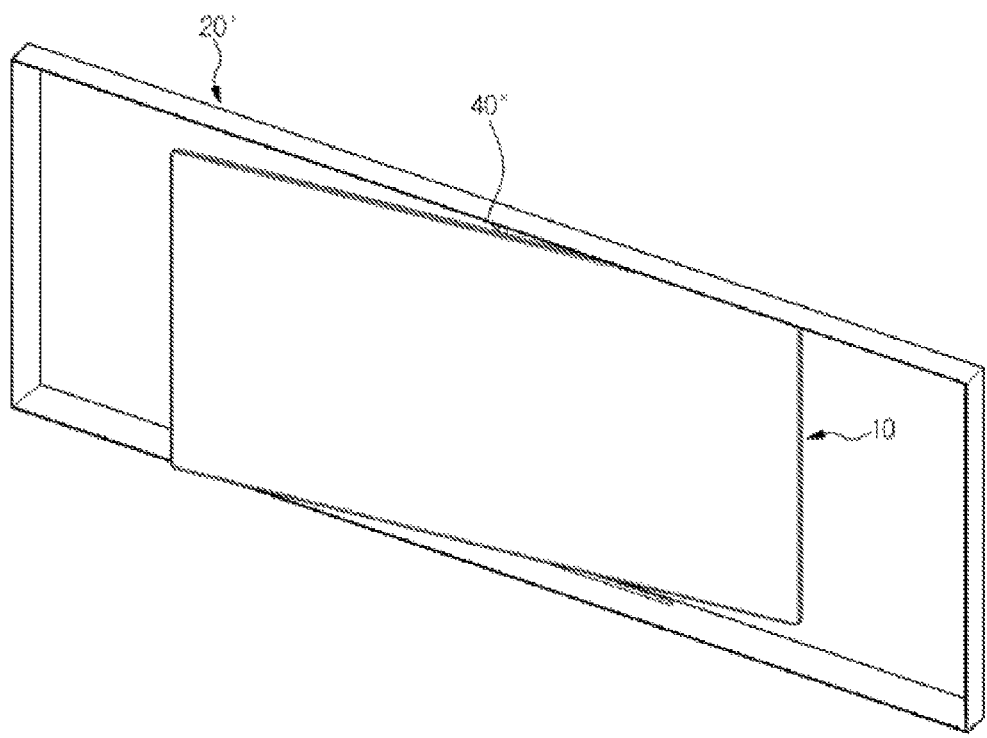
FIG. 52 is a perspective view illustrating right and left rotation of the display unit of the display device according to the embodiment illustrated in FIG. 41.
Figure 53:
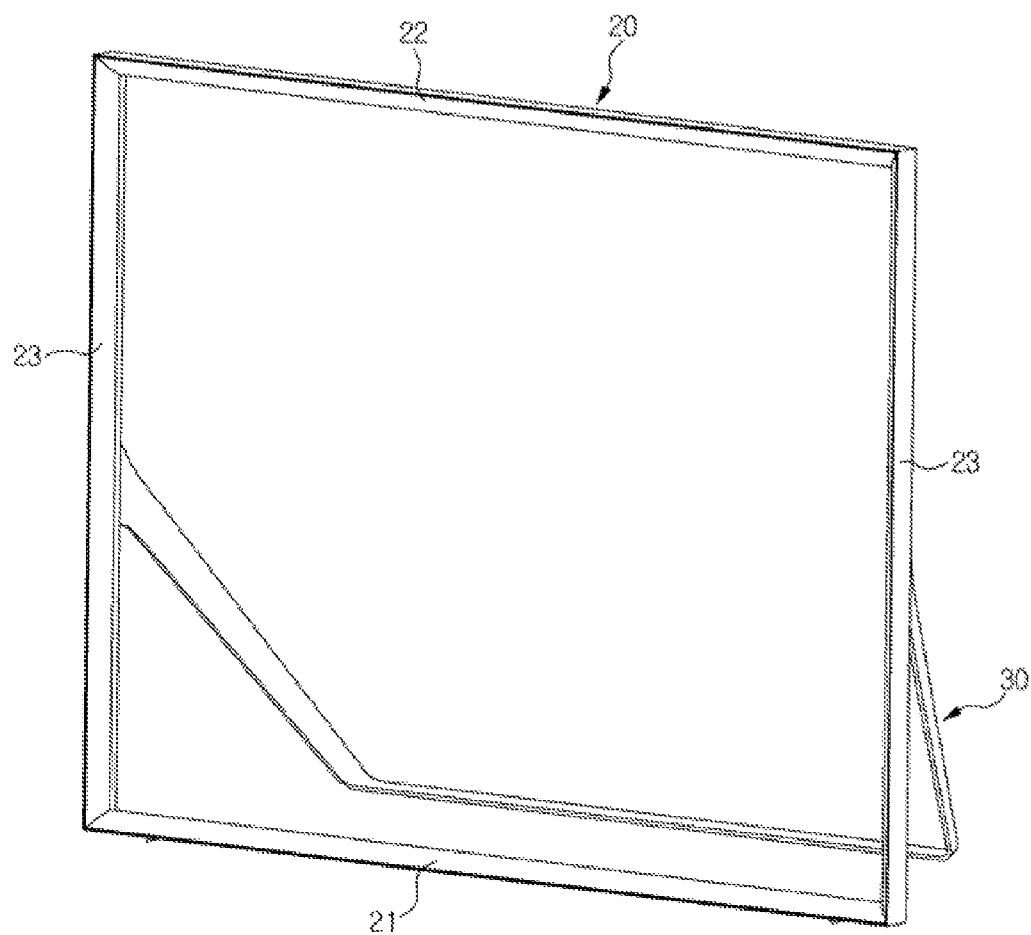
FIG. 53 is a perspective view of a support frame included in a display device according to another embodiment.
Figure 54:
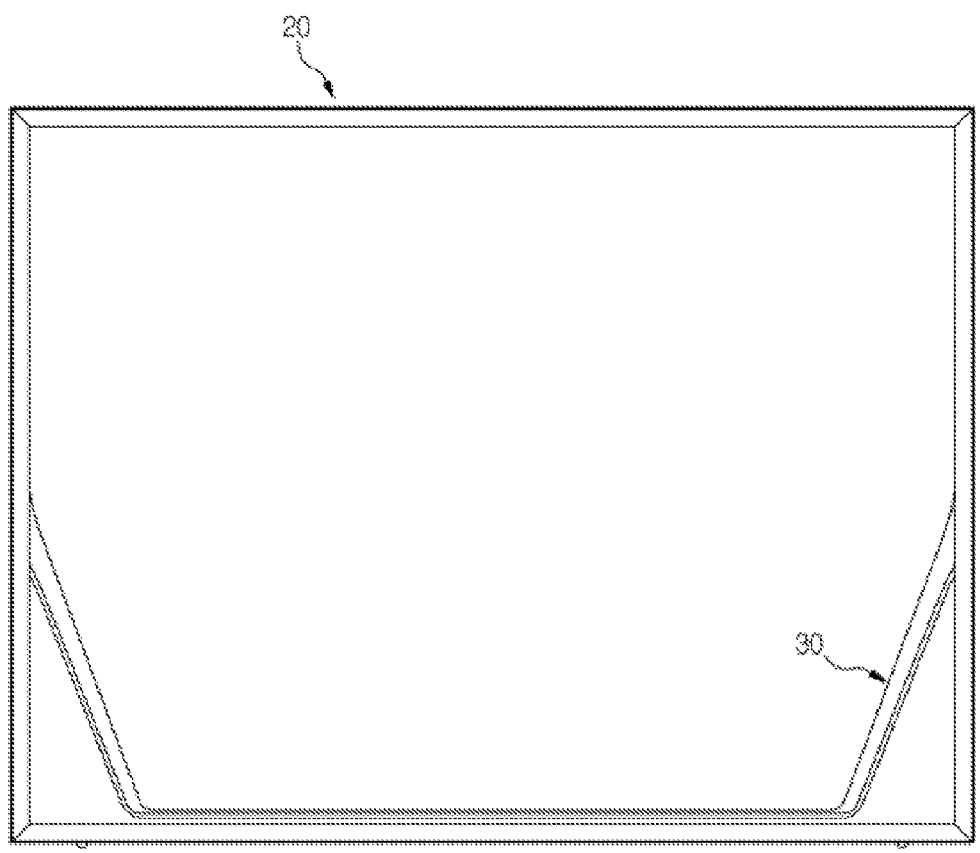
FIG. 54 is a front view of the support frame included in the display device according to the embodiment illustrated in FIG. 53.
Figure 55:
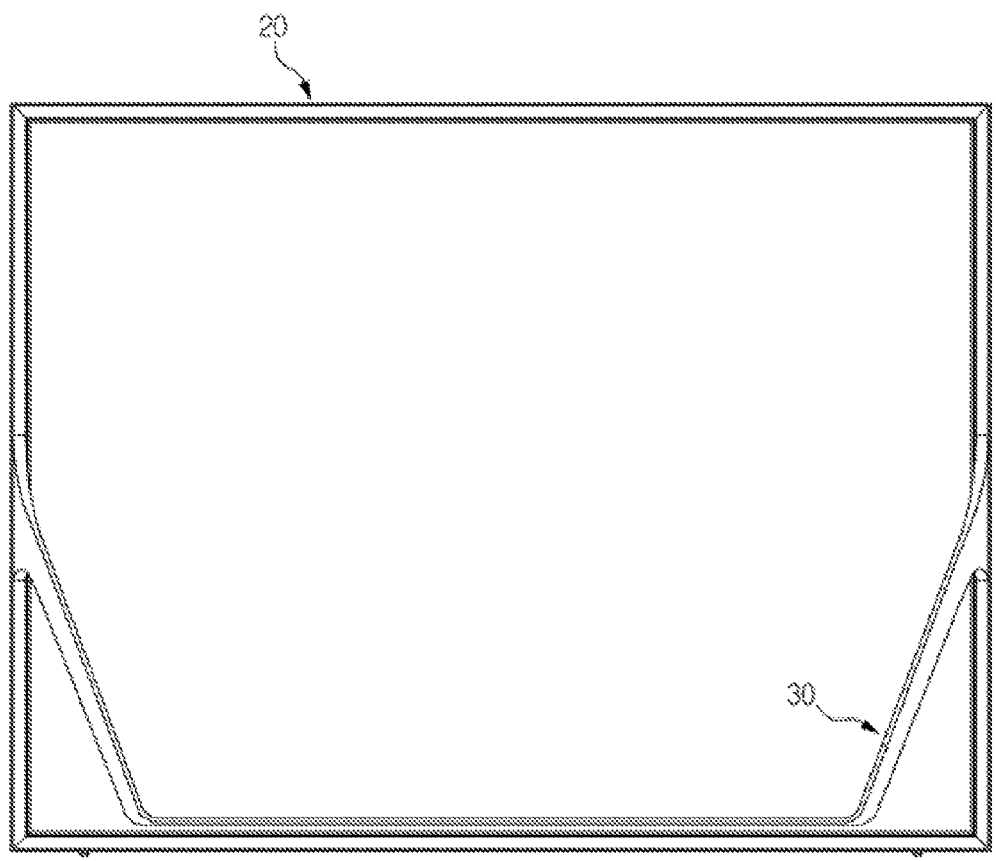
FIG. 55 is a rear view of the support frame included in the display device according to the embodiment illustrated in FIG. 53.
Figure 56:
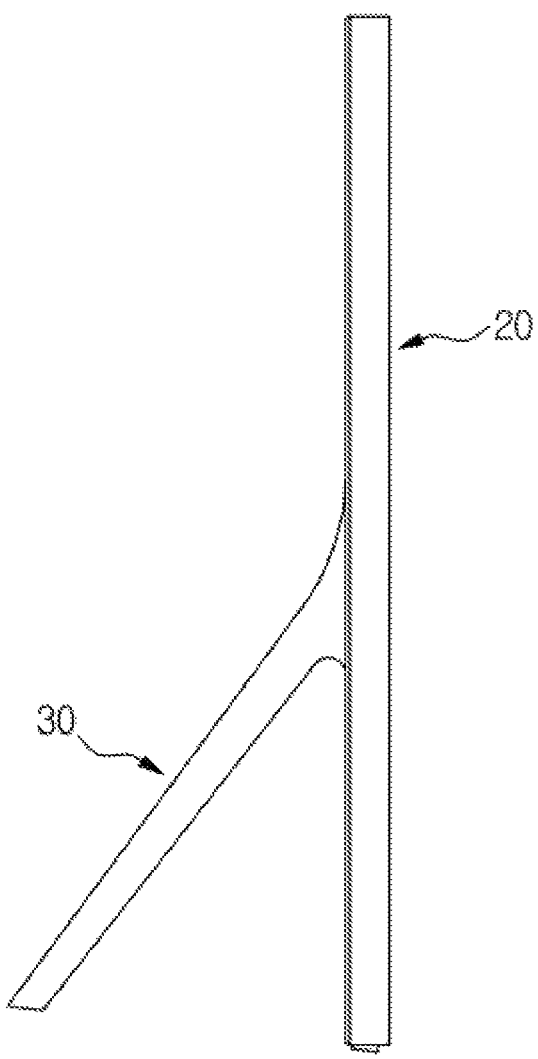
FIG. 56 is a left side view of the support frame included in the display device according to the embodiment illustrated in FIG. 53.
Figure 57:
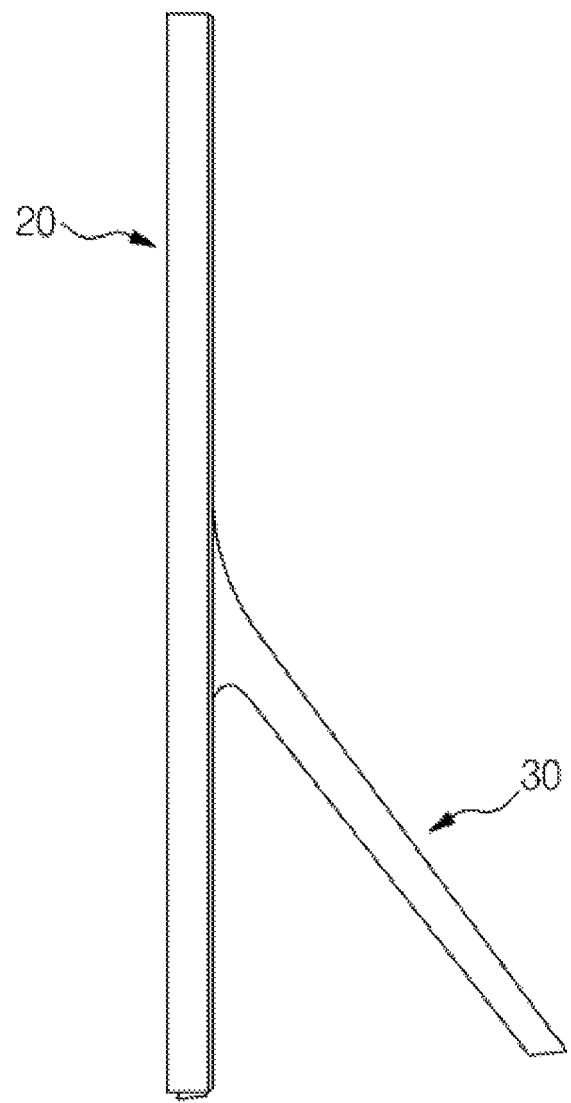
FIG. 57 is a right side view of the support frame included in the display device according to the embodiment illustrated in FIG. 53.
Figure 58:
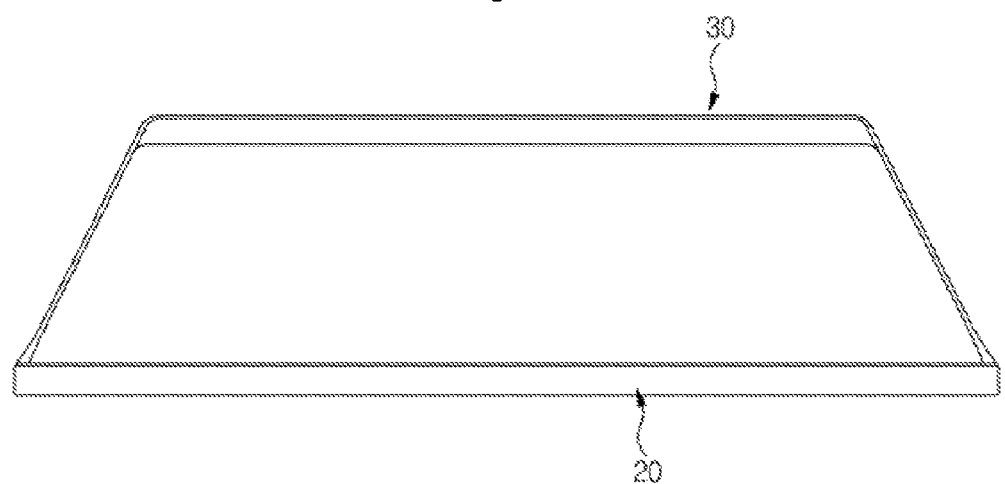
FIG. 58 is a plan view of the support frame included in the display device according to the embodiment illustrated in FIG. 53.
Figure 59:
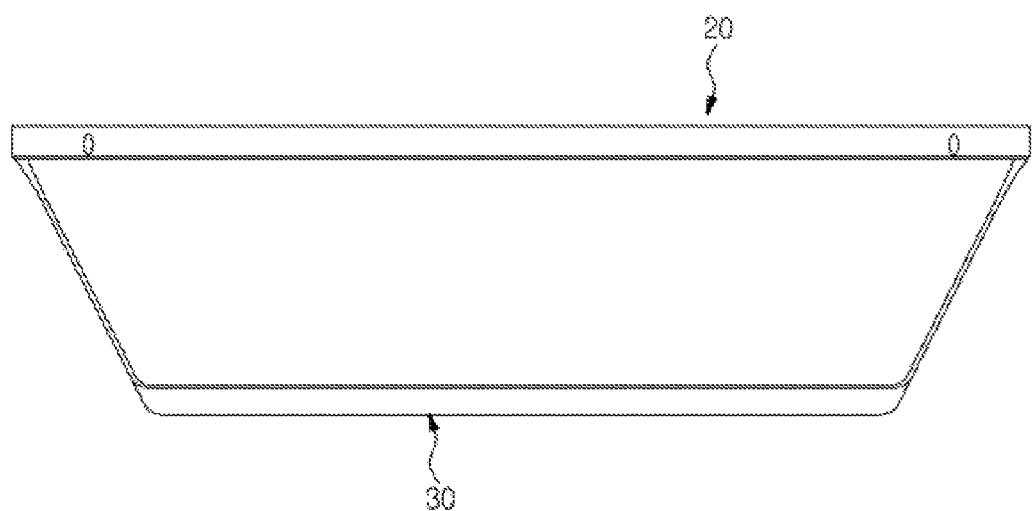
FIG. 59 is a bottom view of the support frame included in the display device according to the embodiment illustrated in FIG. 53.
Figure 60:
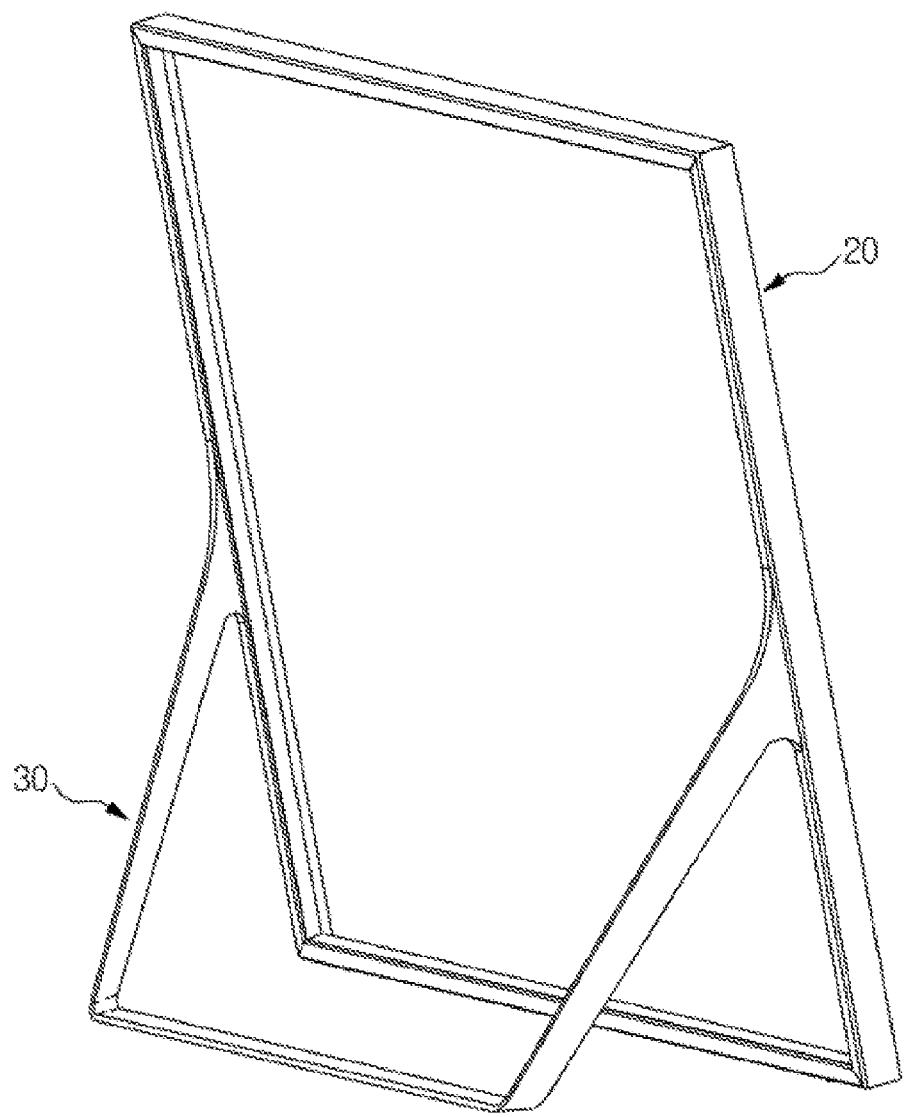
FIG. 60 is a rear perspective view of the support frame included in the display device according to the embodiment illustrated in FIG. 53.

Although the input/output unit 80 according to the present embodiment is detachably installed at the support portion 32 of the leg 30, the present disclosure is not limited thereto. Alternatively, the input/output unit 80 may be installed at the support frame 20, or as shown in FIG. 16, the input/output unit 80 may be installed at the rear surface of the display unit 10.

Although the display unit 10 according to the present embodiment includes the total of four display panels and the two panel driving boards 11b and 11c to drive the four display panels, the present disclosure is not limited thereto. Alternatively, the display unit 10 may include one or two display panel, and in this case, may control the operation of the one or two display panel by use of only one panel driving board disposed at a lower side of the backlight driving board.

In the present embodiment, the leg 30 extends to be inclined backward and downward from the support frame 20, but embodiments of the present invention are not limited thereto. For example, the leg 30 extends backward from a lower end of the support frame 20 to be in parallel to the ground and thus is supported by the ground.

In the present embodiment, the display unit 10 is rotatably installed at the support frame 20 via the two connection shafts 40 and the two hinge units 60, but embodiments of the present invention are not limited thereto. For example, as illustrated in FIGS. 17 through 29, the display unit 10 may be rotatably installed at the support frame 20 via a connection shaft 40, both ends of which are installed at the support frame 20, and a hinge frame 60' installed at a rear surface of the display unit 10 and rotatably installed at the connection shaft 40.

In addition, in the display device according to the embodiment, the display unit 10 is installed at the support frame 20 movably upward or downward via the two support units 50 respectively connected to the two connection shafts 40, but embodiments of the present invention are not limited thereto. For example, as illustrated in FIGS. 30 through 40, the display unit 10 may be installed at wires 70 movably upward or downward such that an upper end of each wire 70 is connected to an upper portion of the support frame 20 and a lower end of each wire 70 is connected to a lower portion of the support frame 20. In this embodiment, the wires 70 include two wires 70 that are spaced apart from each other in a width direction of the display unit 10, and thus, opposite sides of the display unit 10 are installed at the two wires 70 movably upward or downward.

In the display device according to the embodiment of the present invention, the display unit 10 is installed at the support frame 20 so as to be tilted forward or backward, but embodiments of the present invention are not limited thereto. For example, as illustrated in FIGS. 41 through 52, the display unit 10 may be installed within a support frame 20' rotatably in right and left directions via a connection shaft 40" extending upward and downward and a hinge bracket 60" installed on a rear surface of the display unit 10. In addition, in this embodiment, a distance between two side frames 23' of the support frame 20' may be larger than a transverse width of the display unit 10, and the display unit 10 may be installed movably in right and left directions within the support frame 20'.

Embodiments of four sided support frame having a lower frame section, an upper frame section, and right and left side sections have been described, but the present invention is not limited thereto. For example, the support frame may be three sided including lower frame section and right and left side sections with no upper frame section.

Embodiments of display device employing a support frame 20 to movably support an electronic display panel unit 10 have been described, but the present invention is not limited thereto. For example, as illustrated in FIGS. 53 through 60, a support frame described herein may be used for supporting plane-shaped articles such as a picture or a photograph.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A television apparatus comprising:
   a support frame having a first side section and a second side section;
   a leg member extending from the support frame to support the support frame in an inclined orientation;
   a display unit having a chassis;
   a first coupling assembly mounted between a right side edge portion of the chassis and the first side section of the support frame; and
   a second coupling assembly mounted between a left side edge portion of the chassis and the second side section of the support frame,
   wherein the first coupling assembly and the second coupling assembly are configured to movably support the display unit to the support frame, and
   wherein the first coupling assembly and the second coupling assembly respectively comprise:
      a connection member including a first end connected to the display unit and a second end connected to the support frame; and
      a locking member configured to lock the first coupling assembly and the second coupling assembly to the support frame,
      wherein the first coupling assembly and the second coupling assembly are configured to enable the display unit selectively move upward or downward along the support frame, and
   wherein the support frame further comprises:
      a lower frame section supported by a ground; and
      an upper frame section disposed above the lower frame section with the first side section and the second side section connecting opposite ends of the upper frame sections to opposite ends of the lower frame section,
      wherein the first coupling assembly and the second coupling assembly are configured to enable the display unit move upward and downward between the upper frame section and the lower frame section.

2. The television apparatus according to claim 1, wherein a tilting angle of the display unit is adjustable via the first coupling assembly including a first hinge unit installed at the right side edge portion of the chassis, and a first connection member disposed between the first hinge unit and the first side section of the support frame, and the second coupling assembly including a second hinge unit installed at the left side edge portion of the chassis, and a second connection member disposed between the second hinge unit and the second side section of the support frame.

3. The television apparatus according to claim 1, wherein a tilting angle and a height of the display unit are adjustable via the first coupling assembly including a first hinge unit installed at the right side edge portion of the chassis, a first support unit installed in the first side section of the support frame, and a first connection member disposed between the first hinge unit and the first support unit, and the second coupling assembly including a second hinge unit installed at the left side edge portion of the chassis, a second support unit installed in the second side section of the support frame, and a second connection member disposed between the second hinge unit and the second support unit.

4. The television apparatus according to claim 1, wherein the display unit comprises a flat display panel and a first timing control board disposed at an upper side of the display unit to control driving of an upper region the display panel, and a second timing control board disposed at a lower side of the display unit to control driving of a lower region the display panel.

5. The television apparatus according to claim 3, further comprising a cable extending between the support frame and the display unit;
   a bobbin around which the cable is wound;
   a bobbin guide rail on which the bobbin is movably installed; and
   an elastic member elastically supporting the bobbin.

6. The television apparatus according to claim 1, wherein a distance between the upper frame section and the lower frame section is greater larger than a longitudinal width of the display unit.

7. A display device comprising:
a display unit to display an image, the display unit having a chassis;
at least one coupling assembly; and
a support frame having an upright tetragonal shape and provided at an inner side thereof with the display unit,
wherein the at least one coupling assembly is mounted between the display unit and the support frame, and
wherein the at least one coupling assembly comprises:
a connection member including a first end connected to the display unit and a second end connected to the support frame; and
locking members configured to lock the at least one coupling assembly to the support frame,
wherein the at least one coupling assembly is configured to enable the display unit selectively move upward or downward along the support frame, and
wherein the support frame further comprises:
a lower frame section supported by a ground; and
an upper frame section disposed above the lower frame section with a first side section and a second side section connecting opposite ends of the upper frame sections to opposite ends of the lower frame section,
wherein the first coupling assembly and the second coupling assembly are configured to enable the display unit move upward and downward between the upper frame section and the lower frame section,
wherein a distance between the upper frame section and the lower frame section is larger than a longitudinal width of the display unit, and the display unit is installed in the support frame movably upward and downward,
wherein the at least one coupling assembly includes a pair of connection members having first ends respectively installed at opposite sides of the display unit and second ends respectively installed at o opposite sides of the support frame and a pair of support units installed in the support frame to respectively support the second ends of the connection members movably upward and downward, and
wherein each of the support units comprises a hollow cylinder and a gas spring comprising a rod movably installed at the cylinder.

8. The display device according to claim 7, wherein the support frame comprises a leg extending backward therefrom and supported by a ground.

9. The display device according to claim 8, wherein the leg comprises a leg extending to be inclined backward and downward from the support frame and supported by the ground.

10. The display device according to claim 9, wherein the leg comprises a pair of extension portions extending from opposite sides of the support frame backward and downward and a support portion connecting rear ends of the extension portions and supported by the ground.

11. The display device according to claim 8, wherein the leg is separably installed at the support frame.

12. The display device according to claim 7, wherein the locking members are respectively installed at the connection members movably in a member direction, and the support frame comprises guide slots extending upward and downward to enable the connection members to be movable upward and downward and locking grooves arranged at the guide slots to have a shape corresponding to that of the locking members to enable the locking members to be inserted thereinto.

13. The display device according to claim 7, wherein the at least one coupling assembly includes at least one wire having an upper end connected to an upper portion of the support frame and a lower end connected to a lower portion of the support frame, wherein the display unit is installed at the wire movably upward and downward.

14. The display device according to claim 7, wherein the display unit is installed at the support frame to be tilted forward and backward.

15. The display device according to claim 14, wherein the at least one coupling assembly includes:
a connection member having a first end installed at the support frame and a second end rotatably installed at the display unit; and
a hinge unit installed at the display unit and rotating together with the display unit through rotatable installation of the connection member at the hinge unit.

16. The display device according to claim 14, wherein the hinge unit comprises a fixed bracket fixed to the display unit and a hinge bracket installed at the fixed bracket and provided with the connection member rotatably installed thereat.

17. The display device according to claim 16, wherein the hinge unit comprises a friction bracket installed at the fixed bracket in parallel to the hinge bracket and comprising a friction portion to restrict rotation of the display unit, a friction member fixed to the connection member and rubbing against the friction portion while rotating with the connection member, and a friction spring installed at the connection member and pressing the friction member toward the friction portion.

18. The display device according to claim 15, wherein the hinge unit comprises a support spring having an upper end fixed to an upper portion of the friction bracket and a lower end elastically supporting a lower portion of the connection member.

19. The display device according to claim 7, wherein a distance between the pair of side frame sections is larger than a transverse width of the display unit, and the display unit is installed in the support frame movably in right and left directions.

20. The display device according to claim 7, wherein the display unit comprises a pair of main speakers disposed at opposite sides of a lower portion of a rear surface of the display unit.

21. The display device according to claim 7, further comprising an input/output unit configured to input/output signals,
a leg extending from the support frame backward and downward and supported by the ground,
wherein the leg comprises a pair of extension portions extending from opposite sides of the support frame backward and downward and a support portion connecting rear ends of the extension portions and supported by the ground, and
wherein the input/output unit is detachably installed at the support portion.

22. The display device according to claim 7, further comprising at least one circuit board installed at a rear surface of the display unit ,
wherein the at least one circuit board comprises a power board to supply power, a signal processing board to process image signals, a panel driving board to control an operation of a display panel built in the display unit, and a backlight driving board to control an operation of a backlight unit built in the display unit.

23. The display device according to claim 22, wherein the coupling assembly includes a hinge unit installed at the display unit and rotating together with the display unit through rotatable installation of the connection member at the hinge unit; and a connection cable extending through the hinge unit and configured to connect the circuit board to electronic components disposed at an inside of the support frame.

24. The display device according to claim 23, wherein the support frame comprises:

a bobbin around which the connection cable is wound;

a bobbin guide rail on which the bobbin is installed movably up and down; and an elastic member elastically supporting the bobbin downward.

25. The display device according to claim 10, further comprising a cable extending from the display unit, wherein one of the extension portions comprises a cable accommodating groove to accommodate a part of the cable and a cable cover to cover the cable accommodating groove.

26. The display device according to claim 25, further comprising an input/output unit, wherein the cable comprises a power cable connected to an external power source and an input/output cable connected to the input/output unit.

27. The display device of claim 7, wherein the at least one coupling assembly is configured to movably support the display unit to the support frame.

* * * * *